US012770349B2

(12) United States Patent
Kim

(10) Patent No.: US 12,770,349 B2
(45) Date of Patent: Oct. 20, 2026

(54) ELECTRONIC DEVICE GENERATING 3D MODEL OF HUMAN AND ITS OPERATION METHOD

(71) Applicant: ELECTRONICS AND TELECOMMUNICATIONS RESEARCH INSTITUTE, Daejeon (KR)

(72) Inventor: Ho Won Kim, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 301 days.

(21) Appl. No.: 18/201,360

(22) Filed: May 24, 2023

(65) Prior Publication Data

US 2024/0078773 A1 Mar. 7, 2024

(30) Foreign Application Priority Data

May 26, 2022 (KR) ........................ 10-2022-0064794
Jan. 3, 2023 (KR) ........................ 10-2023-0000924
May 23, 2023 (KR) ........................ 10-2023-0066309

(51) Int. Cl.
*G06T 19/20* (2011.01)
*G06T 7/73* (2017.01)
(Continued)

(52) U.S. Cl.
CPC ................ *G06T 19/20* (2013.01); *G06T 7/74* (2017.01); *G06T 15/205* (2013.01); *G06T 17/00* (2013.01);
(Continued)

(58) Field of Classification Search
CPC ......... G06T 19/20; G06T 7/74; G06T 15/205; G06T 17/00; G06T 2207/10024;
(Continued)

(56) References Cited

U.S. PATENT DOCUMENTS 9,508,197 B2 11/2016 Quinn et al.
2014/0168216 A1 6/2014 Kim et al.
(Continued)

FOREIGN PATENT DOCUMENTS

CN 108829232 A * 11/2018 .............. G06F 3/011
CN 110084744 A * 8/2019 ........... G06T 3/4038
(Continued)

OTHER PUBLICATIONS

Xucong Zhang et al., "Revisiting data normalization for appearance-based gaze estimation", ETRA'18, Jun. 2018, Warsaw, Poland.
(Continued)

*Primary Examiner* — Said Broome
*Assistant Examiner* — Denis Vasiliy Minko
(74) *Attorney, Agent, or Firm* — LRK PATENT LAW FIRM

(57) ABSTRACT

An electronic device for generating a 3D model and a method of operating the electronic device. The method includes: receiving an image including a person to be modeled; generating, from the image, part-specific normalized images including perspective projection characteristics for respective parts of a body of the person; outputting part-specific control parameters including part-specific appearance control parameters representing appearance of the person from the part-specific normalized images; updating a canonical 3D model in fixed pose and size by accumulating appearance information of the person based on the part-specific control parameters; receiving control information for controlling a 3D model of the person from a user and
(Continued)

controlling the canonical 3D model based on the control information; generating part-specific rendered images of the 3D model based on the canonical 3D model; and generating a 3D model of the person by synthesizing the part-specific rendered images.

19 Claims, 17 Drawing Sheets

(51) Int. Cl.
*G06T 15/20* (2011.01)
*G06T 17/00* (2006.01)

(52) U.S. Cl.
CPC ............... *G06T 2207/10024* (2013.01); *G06T 2207/20081* (2013.01); *G06T 2207/20084* (2013.01); *G06T 2207/30196* (2013.01); *G06T 2210/44* (2013.01); *G06T 2219/2012* (2013.01); *G06T 2219/2016* (2013.01); *G06T 2219/2021* (2013.01)

(58) Field of Classification Search
CPC . G06T 2207/20081; G06T 2207/20084; G06T 2207/30196; G06T 2210/44; G06T 2219/2012; G06T 2219/2016; G06T 2219/2021; G06T 7/73; G06T 2219/2008; G06T 15/08; G06T 15/20; G06T 17/20; G06T 13/40; G06T 15/50
See application file for complete search history.

(56) References Cited

U.S. PATENT DOCUMENTS

| | | | | |
|---|---|---|---|---|
| 2016/0191887 | A1* | 6/2016 | Casas | H04N 13/156<br>348/47 |
| 2018/0374242 | A1 | 12/2018 | Li et al. | |
| 2020/0160613 | A1 | 5/2020 | Han et al. | |
| 2021/0201502 | A1* | 7/2021 | Hsu | G06V 40/171 |
| 2021/0358197 | A1 | 11/2021 | Shysheya et al. | |
| 2022/0036626 | A1 | 2/2022 | Vo et al. | |

FOREIGN PATENT DOCUMENTS

| | | | | |
|---|---|---|---|---|
| CN | 111860067 | A * | 10/2020 | G06V 20/53 |
| KR | 20050100195 | A * | 10/2005 | H04N 21/21805 |
| KR | 10-2022-0065349 | A | 5/2022 | |
| WO | WO-2006105625 | A1 * | 10/2006 | G06T 19/20 |
| WO | 2021/243258 | A1 | 12/2021 | |

OTHER PUBLICATIONS

Ben Mildenhall et al., "NeRF: Representing Scenes as Neural Radiance Fields for View Synthesis", Communications of the ACM, Jan. 2022, vol. 65, No. 1.
Chung-Yi Weng et al., "HumanNeRF: Free-viewpoint Rendering of Moving People from Monocular Video", CVPR 2022.
Justus Thies et al., "Deferred Neural Rendering : Image Synthesis using Neural Textures", arXiv:1904.12356v1 [cs.CV] Apr. 28, 2019.
Philip-William Grassal et al., "Neural Head Avatars from Monocular RGB Videos", arXiv:2112.01554v2 [cs.CV] Mar. 28, 2022.
Boyi Jiang et al., "SelfRecon: Self Reconstruction Your Digital Avatar from Monocular Video", CVPR 2022.
Mohamed Omran et al., "Neural Body Fitting: Unifying Deep Learning and Model-Based Human Pose and Shape Estimation", arXiv:1808.05942v1 [cs.CV] Aug. 17, 2018.
M. Hofmann et al., "Multi-view 3D Human Pose Estimation in Complex Environment", Int J Comput Vis (2012) 96:103-124.

* cited by examiner

ELECTRONIC DEVICE GENERATING 3D MODEL OF HUMAN AND ITS OPERATION METHOD

CROSS-REFERENCE TO RELATED APPLICATIONS

This application claim priority to Korean Patent Application No. 10-2022-0064794, filed on May 26, 2022, Korean Patent Application No. 10-2023-0000924, filed on Jan. 3, 2023, and Korean Patent Application No. 10-2023-0066309, filed on May 23, 2023, in the Korean Intellectual Property Office, the disclosures of which are incorporated by reference herein in its entirety.

BACKGROUND

1. Technical Field

The present disclosure relates to an electronic device for generating a three-dimensional (3D) model of a human and a method of operating the electronic device, and more particularly, to a method of generating a controllable photorealistic 3D model using perspective projection characteristics.

2. Description of Related Art

As a method of generating a digital human that may express a realistic three-dimensional (3D) appearance and motion of a user using a camera, various methods such as computer graphics (CG), 3D scanning, and neural rendering may be used.

The CG method may require a great amount of time, cost, and operators' expertise to generate a photorealistic 3D human model. Although a CG-based 3D model may be photorealistic, generating a 3D model corresponding to a real appearance of a user may be more difficult.

To overcome such limitations of the CG method, the 3D scanning method using a plurality of multi-view cameras may be used. The 3D scanning method using a plurality of multi-view cameras may generate a 3D dummy model through 3D scanning and may generate a mesh-based 3D model through rigging for bone (or skeletal) animation control.

Although these methods may generate a photorealistic 3D human model, they may still require time, cost, and operators' expertise, compared to the neural rendering method based on a neural radiance field (NeRF). In the case of hair in particular, the 3D scanning method may not readily implement realistic 3D scanning. Further, in the case of an overlap between hair and face, the 3D scanning method may lose its reliability drastically.

In contrast, the neural rendering method may not require operators' intervention to generate a 3D model, unlike the other methods using CG and 3D scanning. In addition, the neural rendering method may generate a realistic 3D image without restrictions such as hairstyle and the like.

However, when there is a change in motion, gaze movement, or facial expression that may cause an external deformation occurs during image capturing, the neural rendering method may generate a blurred image even though it generates a 3D model with realistic 3D expression. In addition, as the resolution of an image to be rendered increases, the learning time and rendering time of a neural rendering model may increase, and thus practical application may be difficult. In addition, when training the neural rendering model at once using a whole-body image including the head and hands of a person, details of areas (e.g., hands, face, etc.) occupying a relatively small proportion of the whole may not be realistically rendered. That is, such areas occupying a small proportion of the whole may be blurred.

Therefore, there is a need for a neural rendering-based 3D model generation method that may solve such issues of limitations of the neural rendering method in generating a high-resolution image and expressing in detail the areas occupying a small proportion of the whole.

SUMMARY

The present disclosure provides a method that may predict an appearance control parameter for each part of a body based on perspective projection and generate a photorealistic three-dimensional (3D) model with controllable external deformation.

The present disclosure provides a method that may train a neural rendering model based on perspective projection and appearance control parameters and generate a photorealistic 3D model using the trained neural rendering model.

Technical Solutions

According to an embodiment, there is provided a method of operating an electronic device, the method including: receiving an image including a person who is a target to be modeled; generating, from the image, part-specific normalized images including perspective projection characteristics for respective parts constituting a body of the person; outputting part-specific control parameters including part-specific appearance control parameters representing an appearance of the person from the part-specific normalized images; updating a canonical three-dimensional (3D) model in a static state with a fixed pose and size without a movement by accumulating appearance information of the person based on the part-specific control parameters; receiving control information for controlling a 3D model of the person, which is a final output, from a user and controlling the canonical 3D model based on the control information, wherein the control information may include camera view control information about a camera view at which the 3D model of the person is to be displayed, pose control information for the 3D model of the person, and style control information for the 3D model of the person; generating part-specific rendered images constituting the 3D model of the person based on the controlled canonical 3D model; and generating a 3D model of the person by synthesizing the part-specific rendered images.

The generating the part-specific normalized images including the perspective projection characteristics may include: predicting a whole-body 3D pose representing a pose of the person based on a coordinate system of a camera capturing the image; and generating the part-specific normalized images based on the whole-body 3D pose.

The predicting the whole-body 3D pose may include: predicting positions and poses of joints of a whole body of the person; predicting a pose of a head of the person; predicting a pose of both hands of the person; and predicting the whole-body 3D pose based on the coordinate system by combining the positions and poses of the joints, the pose of the head, and the pose of both hands with respect to the whole body.

The generating the part-specific normalized images based on the whole-body 3D pose may include: arranging virtual normalization cameras for capturing images of the respective parts at positions separated from the parts by predetermined distances to capture images of a head, both hands, and a whole body, respectively, using the whole-body 3D pose; and generating the part-specific normalized images including the perspective projection characteristics, using the virtual normalization cameras capturing the images of the respective parts.

The part-specific normalized images may include a normalization head image, a normalized both-hand image, and a normalized whole-body image obtained through the virtual normalization cameras capturing the images of the respective parts.

The outputting the part-specific control parameters may include: inputting, to part-specific control parameter prediction models, the part-specific normalized images corresponding to the part-specific control parameter prediction models, and outputting the part-specific control parameters including the part-specific appearance control parameters representing the appearance of the person.

The generating the canonical 3D model may include: updating a whole-body 3D pose by integrating the part-specific appearance control parameters representing the appearance of the person, included in the part-specific control parameters; and updating the canonical 3D model using the updated whole-body 3D pose and the part-specific control parameters.

The updating the whole-body 3D pose may include: transforming part-specific pose information included in the part-specific appearance control parameters into a coordinate system of a whole-body normalization camera among part-specific normalization cameras capturing the part-specific normalized images; and updating the whole-body 3D pose in the coordinate system of the whole-body normalization camera by integrating the part-specific pose information transformed into the coordinate system.

The updating the canonical 3D model using the updated whole-body 3D pose and the part-specific control parameters may include: updating the canonical 3D model by transforming 3D points of the body represented in the coordinate system of the whole-body normalization camera into a coordinate system in which the canonical 3D model is represented and accumulating the 3D points in the canonical 3D model.

The generating the part-specific rendered mages may include: training part-specific neural rendering models using, as an input, positions of 3D points included in the canonical 3D model, a viewing point of a whole-body normalization camera, and the part-specific appearance control parameters comprised in the part-specific control parameters, such that the part-specific neural rendering models output an output including a density value indicating a probability that the 3D points are present in a space of a canonical model coordinate system, a color value of the 3D points in the canonical model coordinate system, and information about a part in which the 3D points are present; and generating the part-specific rendered image corresponding to the controlled canonical 3D model through volume rendering using the output of the trained part-specific neural rendering models.

The part-specific rendered images may include: a rendered head image, a rendered both-hand image, and a rendered whole-body image corresponding to the part-specific normalized images. The generating the 3D model of the person by synthesizing the part-specific rendered images may include: when synthesizing the rendered head image and the rendered both-hand image in the rendered whole-body image, assigning a weight to each of the rendered images, and determining a weight of the rendered head image and the rendered both-hand image to be greater than that of the rendered whole-body image.

In a boundary portion where the rendered whole-body image and the rendered head image overlap, the weight of the rendered head image may be determined to be greater than the weight of the rendered whole-body image as it approaches a head, and in a boundary portion where the rendered whole-body image and the rendered both-hand image overlap, the weight of the rendered both-hand image may be determined to be greater than the weight of the rendered whole-body image as it approaches both hands.

According to an embodiment, there is provided a method of operating an electronic device, the method including: receiving an image including a person who is a target to be modeled; predicting a pose of the person in the image; generating part-specific normalized images including perspective projection characteristics by arranging virtual normalization cameras for capturing image of respective parts at positions separated from the parts by predetermined distances to capture images of a head, both hands, and a whole body of the person, respectively, based on the predicted pose of the person; outputting part-specific control parameters including part-specific appearance control parameters representing an appearance of the person from the part-specific normalized images; updating a canonical 3D model in a static state with a fixed pose and size without a movement by accumulating appearance information of the person based on the part-specific control parameters; receiving control information for controlling a 3D model of the person, which is a final output, from a user and controlling the canonical 3D model based on the control information, wherein the control information may include camera view control information about a camera view at which the 3D model of the person is to be displayed, pose control information for the 3D model of the person, and style control information for the 3D model of the person; generating part-specific rendered images constituting the 3D model of the person based on the controlled canonical 3D model; and generating a 3D model of the person by synthesizing the part-specific rendered images.

According to an embodiment, there is provided an electronic device including a processor configured to: receive an image of a person who is target be modeled; generate, from the image, part-specific normalized images including perspective projection characteristics for respective parts constituting a body of the person; output part-specific control parameters including part-specific appearance control parameters representing an appearance of the person from the part-specific normalized images; update a canonical 3D model in a static state with a fixed pose and size without a movement by accumulating appearance information of the person based on the part-specific control parameters; receive control information for controlling a 3D model of the person, which is a final output, from a user, and control the canonical 3D model based on the control information, wherein the control information may include camera view control information about a camera view at which the 3D model of the person is to be displayed, pose control information for the 3D model of the person, and style control information for the 3D model of the person; generate part-specific rendered images constituting the 3D model of the person based on the controlled canonical 3D model; and generate a 3D model of the person by synthesizing the part-specific rendered images.

The processor may predict a whole-body 3D pose representing a pose of the person based on a coordinate system of a camera capturing the image; and generate the part-specific normalized images based on the whole-body 3D pose.

The processor may predict positions and poses of joints of a whole body of the person; predict a pose of a head of the person; predict a pose of both hands of the person; and predict the whole-body 3D pose based on the coordinate system by combining the positions and poses of the joints, the pose of the head, and the pose of both hands with respect to the whole body of the person.

The processor may arrange virtual normalization cameras for capturing images of the respective parts at positions separated by predetermined distances from the parts to capture images of a head, both hands, and a whole body, respectively, using the whole-body 3D pose; and generate the part-specific normalized images including the perspective projection characteristics using the virtual normalization cameras capturing the images of the respective parts.

The part-specific normalized images may include a normalized head image, a normalized both-hand image, a normalized whole-body image obtained through the virtual normalization cameras capturing the images of the respective parts constituting the body. The processor may input, to part-specific control parameter prediction models, the part-specific normalized images corresponding to the part-specific control parameter prediction models, and output the part-specific control parameters including the part-specific appearance control parameters representing the appearance of the person.

The processor may update a whole-body 3D pose by integrating the part-specific appearance control parameters for controlling the appearance of the 3D model of the person included in the part-specific control parameters, and update the canonical 3D model using the updated whole-body 3D pose and the part-specific control parameters.

Advantageous Effects

According to an embodiment of the present disclosure, an appearance control parameter for each part of a body may be predicted based on perspective projection, and a photorealistic three-dimensional (3D) model with controllable external deformation may be generated.

According to an embodiment of the present disclosure, a neural rendering model may be trained based on perspective projection and an appearance control parameter for each part of a body, and a photorealistic 3D model may be generated using the trained neural rendering model.

DETAILED DESCRIPTION OF THE INVENTION

Figure 1:
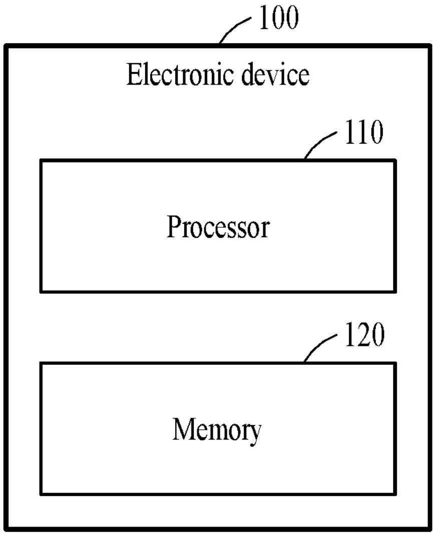
FIG. 1 is a diagram illustrating an electronic device according to an embodiment of the present disclosure.

Hereinafter, embodiments will be described in detail with reference to the accompanying drawings. When describing the embodiments with reference to the accompanying drawings, like reference numerals refer to like components and a repeated description related thereto will be omitted.

The following detailed structural or functional description is provided only for illustrative purposes, and various alterations and modifications may be made to examples. Here, examples are not construed as limited to the disclosure and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a first component may be referred to as a second component, and similarly the second component may also be referred to as the first component.

The singular forms “a,” “an,” and “the” are intended to include the plural forms as well, unless the context clearly indicates otherwise. As used herein, “A or B,” “at least one of A and B,” “at least one of A or B,” “A, B, or C,” “at least one of A, B, and C,” and “at least one of A, B, or C,” each of which may include any one of the items listed together in the corresponding one of the phrases, or all possible combinations thereof. It will be further understood that the terms “comprises/comprising” and/or “includes/including,” when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, the embodiments of the present disclosure will be described in detail with reference to the accompanying drawings.

FIG. 1 is a diagram illustrating an electronic device according to an embodiment of the present disclosure.

Referring to FIG. 1, an electronic device 100 may include a processor 110 and a memory 120.

The processor 110 and the memory 120 may communicate with each other through a bus, a network on a chip (NoC), a peripheral component interconnect express (PCIe), and the like. In FIG. 1, only the components related to embodiments of the present disclosure are illustrated as being included in the electronic device 100. Thus, the electronic device 100 may also include other general-purpose components, in addition to the components illustrated in FIG. 1.

The processor 110 may perform an overall function for controlling the electronic device 100. The processor 110 may control the electronic device 100 overall by executing programs and/or instructions stored in the memory 120. The processor 110 may be implemented as a central processing unit (CPU), a graphics processing unit (GPU), a tensor processing unit (TPU), a neural processing unit (NPU), an application processor (AP), and the like, but examples of which are not limited thereto.

The memory 120 may be hardware for storing data that has been processed or to be processed in the electronic device 100. In addition, the memory 120 may store an application, a driver, and the like to be driven by the electronic device 100. The memory 120 may include volatile memory such as dynamic random-access memory (DRAM) and/or non-volatile memory.

The electronic device 100 may generate a controllable photorealistic three-dimensional (3D) model of a person included in an input image. For example, the processor 110 of the electronic device 100 may receive, as an input, an image including a person. The processor 110 may detect the person in the input image. The processor 110 may predict a whole-body 3D pose of the detected person. The processor 110 may generate part-specific normalized images including perspective projection characteristics, using part-specific normalization cameras.

The processor 110 may predict part-specific control parameters by inputting the part-specific normalized images to part-specific control parameter prediction models. The processor 110 may train part-specific neural rendering models and generate part-specific rendered images using the trained part-specific neural rendering models. The processor 110 may generate a photorealistic 3D model of the person by synthesizing the part-specific rendered images. The processor 110 may generate a 3D model of the person that is controlled according to a control command input from a user. For example, the processor 110 may generate the 3D model of the person that is controlled based on a camera view, a pose, and a style input from the user.

Figure 2:
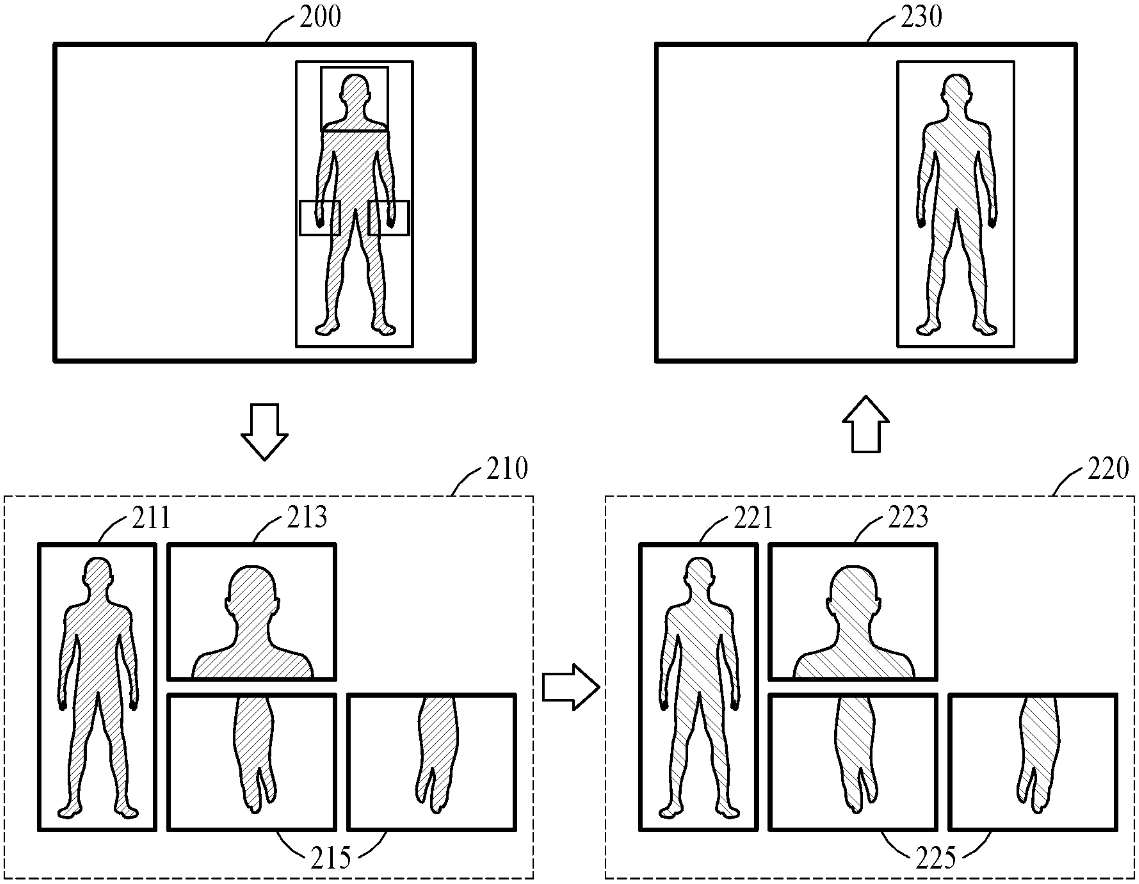
FIG. 2 is a diagram schematically illustrating generation of a three-dimensional (3D) human model according to an embodiment of the present disclosure.

FIG. 2 is a diagram schematically illustrating generation of a 3D human model according to an embodiment of the present disclosure.

FIG. 2 shows an image 200 input to a processor and a synthesized image 230 including a 3D model of a person as a final output.

The image 200 may include a whole body of the person who is a target to be modeled. The 3D model of the person, which is a final result, may be based on perspective projection using a normalization camera to be described below, and thus there is no limit to a position of the person in the image 200.

Similarly, even when a plurality of people is included in the image 200, a 3D model may be generated for each of the people through artificial intelligence (AI)-based identification.

The processor may detect the person from the image 200. The processor may generate part-specific normalized images 210 for respective body parts based on the image 200. The part-specific normalized images 210 may include a normalized whole-body image 211, a normalization head image 213, and a normalized both-hand image 215. The part-specific normalized images 210 may not be generated by simply cropping the image 200 but be generated using part-specific normalization cameras. Accordingly, the part-specific normalized images 210 may include perspective projection characteristics. A method of generating a normalized image of each part (e.g., the part-specific normalized images 210) using a normalization camera (e.g., the part-specific normalization cameras) will be described below with reference to FIG. 8.

The processor may train a neural rendering model based on the part-specific normalized images 210. The processor may generate part-specific rendered images 220 using the trained neural rendering model. The part-specific rendered images 220 may include a rendered whole-body image 221, a rendered head image 223, and a rendered both-hand image 225. In this case, the part-specific rendered images 220 may be part-specific images that are controlled according to a camera view at which the 3D model of the person is to be displayed, a pose of the 3D model of the person, and a style of the 3D model of the person, which are received from a user.

The processor may generate the 3D model of the person by synthesizing the part-specific rendered images 220. The processor may thus generate the synthesized image 230 including the 3D model of the person.

Hereinafter, a method of generating a 3D model will be described in detail.

Figure 3:
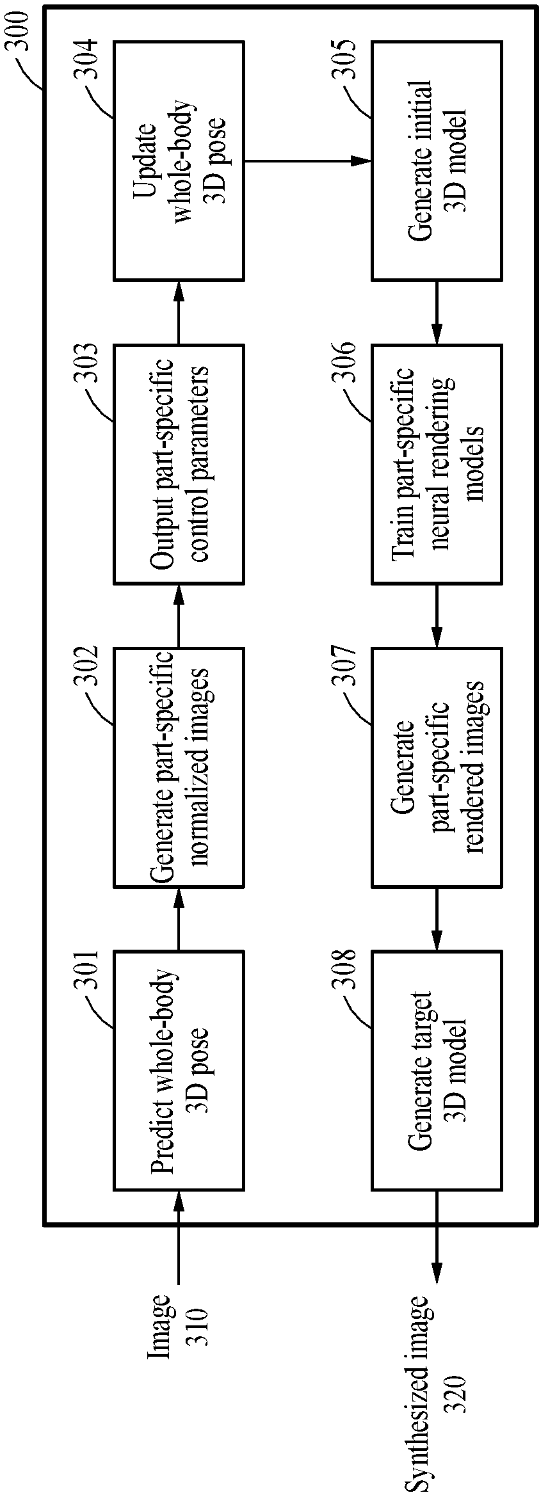
FIG. 3 is a block diagram illustrating generation of a 3D human model according to an embodiment of the present disclosure.

FIG. 3 is a block diagram illustrating generation of a 3D human model according to an embodiment of the present disclosure.

FIG. 3 shows an example of how a processor outputs a synthesized image 320 from an image 310 using a 3D model generator 300.

According to an embodiment, a photorealistic 3D human model may be generated from a 3D model generator 300. The 3D model generator 300 may generate an outward appearance of a 3D model through learning performed based on a deep learning network (DNN) such as a convolutional neural network (CNN) and a multi-layer perceptron (MLP). The 3D model generator 300 may generate a 3D model through self-supervised end-to-end learning only using multi-view images without separate supervision.

The 3D model generator 300 may generate a photorealistic 3D model that assumes an arbitrary pose at an arbitrary viewing point (or direction), using a neural rendering model. That is, the processor may generate a photorealistic 3D model in which various styles such as hairstyles and glasses wearing are controlled using the 3D model generator 300.

In block 301, the processor may predict a whole-body 3D pose from the input image 310 using a pose prediction model. A method of predicting a whole-body 3D pose will be described in detail below with reference to FIG. 7.

In block 302, the processor may generate part-specific normalized images including perspective projection characteristics based on the whole-body 3D pose. A method of generating a normalized image of each part (e.g., the part-specific normalized images) will be described in detail below with reference to FIGS. 8 and 9.

In block 303, the processor may input the part-specific normalized images to part-specific control parameter models, and output part-specific control parameters. The part-specific control parameters may include part-specific 3D shape information, part-specific segment mask information, and part-specific appearance control parameters. A method of outputting a control parameter for each part (e.g., the part-specific control parameters) through a control parameter model for each part (e.g., the part-specific control parameter models) will be described in detail below with reference to FIG. 10.

In block 304, the processor may update the whole-body 3D pose based on part-specific appearance control information included in the part-specific control parameters.

For example, the processor may update the whole-body 3D pose using part-specific 3D pose information included in the part-specific appearance control information.

In block 305, the processor may update a canonical 3D model using the updated whole-body 3D pose and the part-specific appearance control parameters.

The canonical 3D model may be updated as appearance information of a person who is a target of modeling is accumulated in an appearance model in a static state.

A method of generating a canonical 3D model will be described in detail below with reference to FIGS. 11 to 13.

In block 306, the processor may train part-specific neural rendering models. A method of training a neural rendering model for each part (e.g., the part-specific neural rendering models) will be described in detail below with reference to FIGS. 14 and 15.

In block 307, the processor may generate part-specific rendered images using the part-specific neural rendering models.

The processor may control the canonical 3D model according to a control command input from a user. The processor may generate the part-specific rendered images based on the controlled canonical 3D model.

In block 308, the processor may generate a 3D model of the person by synthesizing the part-specific rendered images. The processor may generate the 3D model by performing inverse normalization transformation for inversely transforming the part-specific rendered images from a coordinate system of part-specific normalized image cameras to a coordinate system of an input camera, and then synthesizing the images.

A method of generating a 3D model of a person by synthesizing part-specific rendered images will be described in detail below with reference to FIG. 16. The processor may output the synthesized image 320 including the 3D model of the person through the 3D model generator 300.

Hereinafter, a method of operating an electronic device for generating a 3D model of a person will be described.

Figure 4:
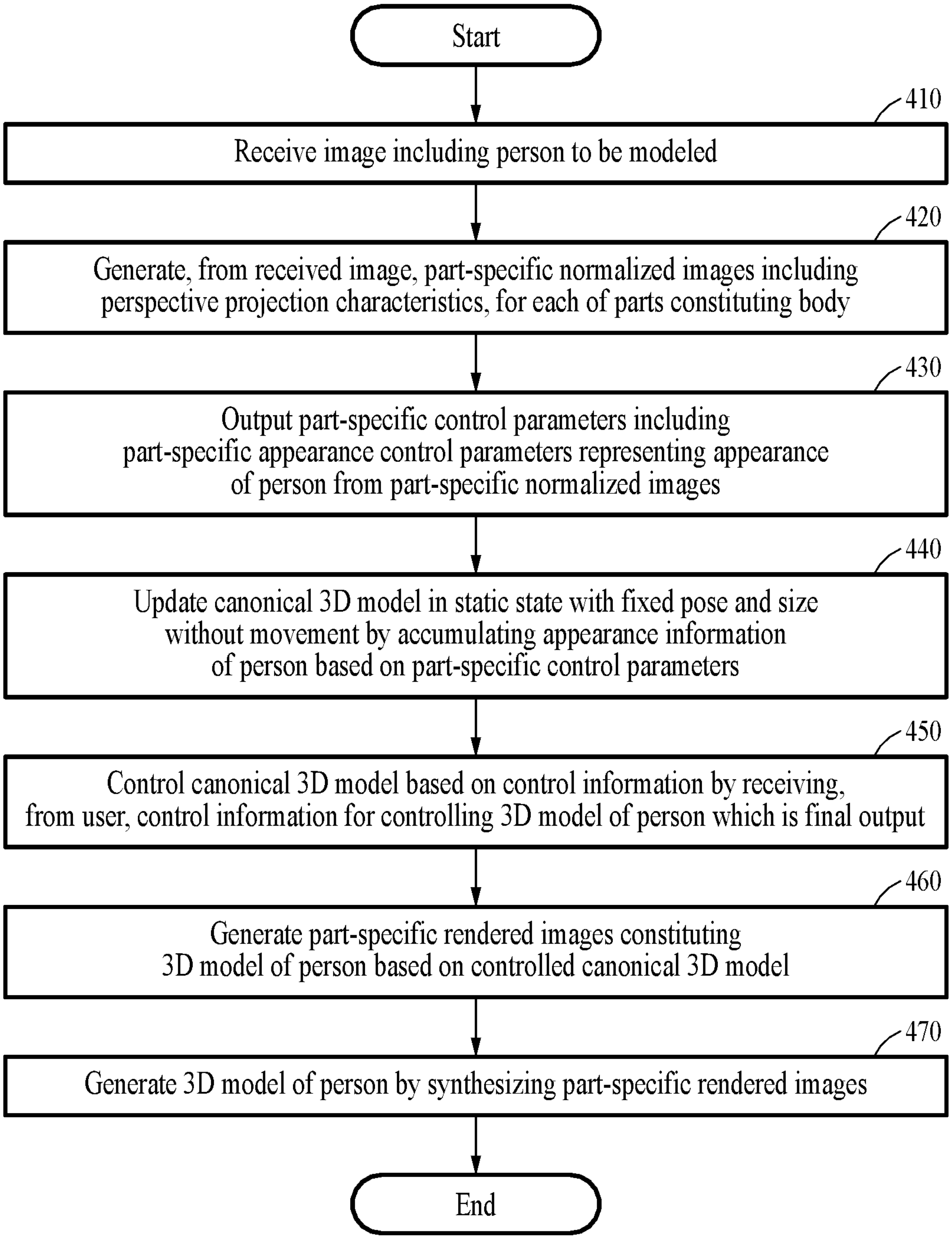
FIG. 4 is a flowchart illustrating a method of operating an electronic device according to an embodiment of the present disclosure.

FIG. 4 is a flowchart illustrating a method of operating an electronic device according to an embodiment of the present disclosure.

Operations to be described below may be performed in sequential order but not necessarily performed in sequential order. For example, the order of the operations may be changed and at least two of the operations may be performed in parallel. Operations 410 to 470 may be performed by a processor (e.g., the processor 110), but examples are not limited thereto.

In operation 410, the processor may receive an image including a person who is a target to be modeled.

For example, when an electronic device generating a 3D model includes a camera, the image may be an image captured by the electronic device, or the image may be captured by a separate electronic device including a camera.

In operation 420, the processor may generate, from the image, part-specific normalized images including perspective projection characteristics, for respective parts constituting a body of the person.

The processor may generate the part-specific normalized images using part-specific normalization cameras. The part-specific normalized images may include a normalized head image, a normalized both-hand image, and a normalized whole-body image obtained through the part-specific normalization cameras that capture the respective parts constituting the body.

In operation 430, the processor may output part-specific control parameters including part-specific appearance control parameters representing an outward appearance of the person from the part-specific normalized images.

The processor may input, to part-specific control parameter prediction models, the part-specific normalized images corresponding to the part-specific control parameter prediction models and output the part-specific control parameters including the part-specific appearance control parameters representing the appearance of the person.

In operation 440, the processor may update a canonical 3D model in a static state with a fixed pose and size without a movement by accumulating appearance information of the person based on the part-specific control parameters.

In operation 450, the processor may receive, from a user, control information for controlling a 3D model of the person which is a final output, and control the canonical 3D model based on the control information.

The control information may include camera view control information on a camera view at which the 3D model is to be displayed, pose control information for the 3D model, and style control information for the 3D model.

In operation 460, the processor may generate part-specific rendered images constituting the 3D model of the person based on the controlled canonical 3D model.

The part-specific rendered images may include a rendered head image, a rendered both-hand image, and a rendered whole-body image corresponding to the part-specific normalized images.

In operation 470, the processor may generate the 3D model of the person by synthesizing the part-specific rendered images.

When synthesizing the rendered head image and the rendered both-hand image into the rendered whole-body image, the processor may assign a weight to each rendered image. The processor may determine a weight of the rendered head image and the rendered both-hand image to be greater than that of the rendered whole-body image.

Hereinafter, the blocks and operations described above with reference to FIGS. 3 and 4 will be described in detail.

Figure 5:
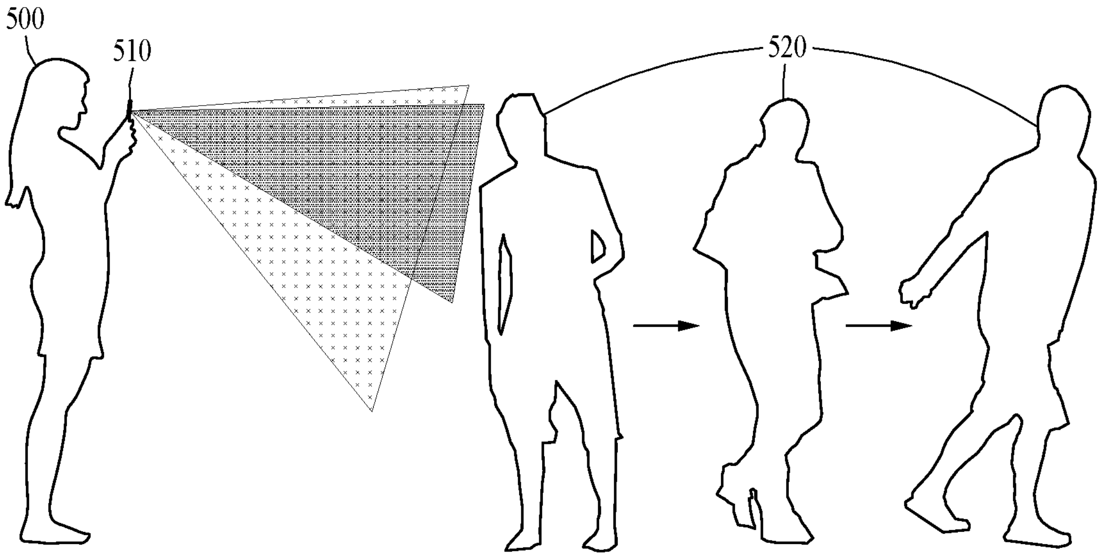
FIG. 5 is a diagram illustrating an image input to an electronic device according to an embodiment of the present disclosure.
Figure 6:
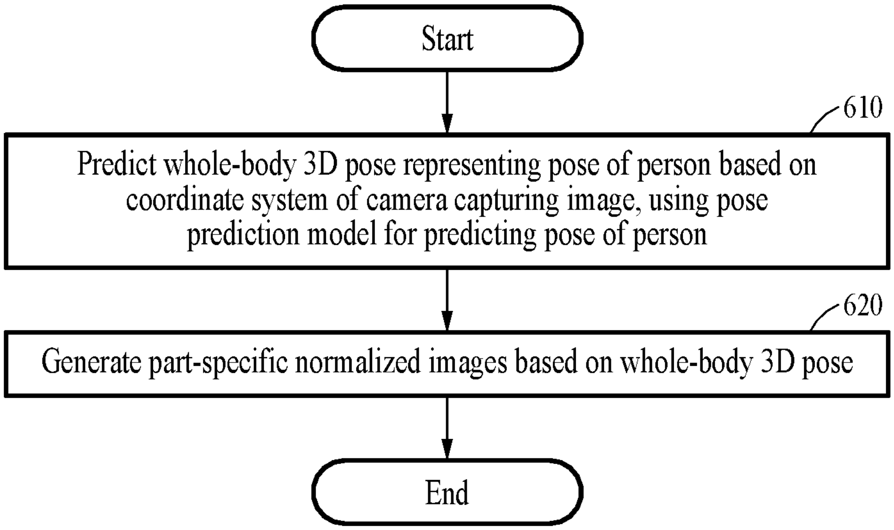
FIGS. 6 to 9 are diagrams illustrating a method of generating a normalized image of each part according to an embodiment of the present disclosure.

FIG. 5 is a diagram illustrating an image input to an electronic device according to an embodiment of the present disclosure.

A user 500 may obtain an image to be input to a 3D model generator by capturing an image of a person 520 in front, using an electronic device 510. The electronic device 510 may generate images of different viewing points in various ways. When the images of different viewing points are input to the 3D model generator, an appearance model may be updated. When the appearance model is updated, a canonical 3D model in which appearance information of the person 520 is accumulated.

According to an embodiment, when the person 520 in front assumes different poses over time as shown in FIG. 5, the electronic device 510 may generate an image of a new viewing point.

According to an embodiment, when the person 520 in front remains at rest but the user 500 is in motion, the electronic device 510 may generate an image of a new viewing point.

According to an embodiment, when the electronic device 510 includes a plurality of cameras having different focal lengths, a synchronized multi-view image may be obtained. When the synchronized multi-view image is input to a processor, 3D depth information on a visible area of a person located in a real space may be additionally obtained. The 3D depth information may be used to improve the accuracy in predicting a whole-body 3D pose in a pose prediction model and solve a scale issue. The 3D depth information may also be used as a true value in a process of training a control parameter prediction model to output 3D shape information for each part. For example, when a multi-view image in which a person to be modeled is at a short distance is input to the processor, a photorealistic 3D model of the person may be generated with only a small number of camera's viewing points.

Accordingly, a 3D model may be generated using a synchronized multi-view image or a plurality of single-view images generated from different camera views.

The electronic device 510 of FIG. 5 may be any one of all types of electronic devices that include a camera configured to capture a red, green, blue (RGB) image of an appearance of a user, such as, for example, a web camera and a digital single-lens reflex (DSLR) camera in addition to a smartphone.

Hereinafter, a method of predicting a pose of a person included in an image and generating a normalized image of each part will be described.

FIGS. 6 to 9 are diagrams illustrating a method of generating a normalized image of each part according to an embodiment of the present disclosure.

Operations to be described below may be performed in sequential order but not necessarily performed in sequential order. For example, the order of the operations may be changed and at least two of the operations may be performed in parallel. Operations 610 and 620 may be performed by a processor (e.g., the processor 110), but examples are not limited thereto.

In operation 610, the processor may predict a whole-body 3D pose representing a pose of a person based on a coordinate system of a camera capturing an image, using a pose prediction model for predicting a pose of a person.

The processor may predict positions and poses of joints of parts of a body excluding a head. The processor may predict a pose of the head. The processor may predict the whole-body 3D pose based on the coordinate system of the camera capturing the image by combining the predicted positions and poses of the joints of the parts excluding the head, and the predicted pose of the head.

A method of predicting a whole-body 3D pose using a pose prediction model by the processor will be described in detail below with reference to FIG. 7.

In operation 620, the processor may generate part-specific normalized images based on the whole-body 3D pose.

The processor may arrange virtual normalization cameras for capturing images of respective parts at positions separated by predetermined distances from the parts such that they capture respective images of a head, both hands, and a whole body of the person, using the whole-body 3D pose. The processor may generate the part-specific normalized images including perspective projection characteristics using the virtual normalization cameras that capture the images of the respective parts.

That is, the processor may generate the part-specific normalized images in which, as the perspective projection characteristics for the parts are maintained, the corresponding parts are changed to have a constant ratio, position, and size in the corresponding images.

A method of generating a normalized image of each part (e.g., the part-specific normalized images) based on a whole-body 3D pose will be described in detail below with reference to FIGS. 8 and 9.

Figure 7:
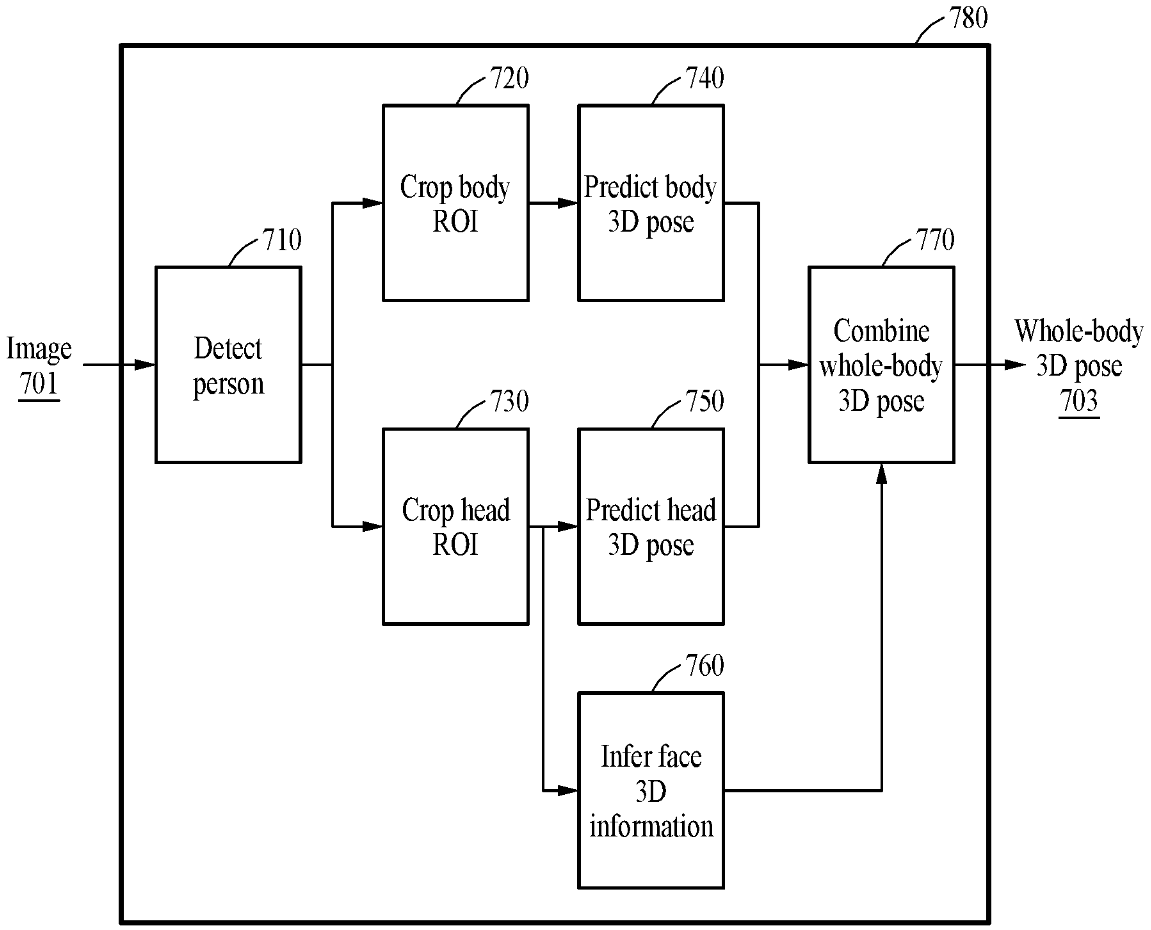

FIG. 7 shows a block diagram of the prediction of a whole-body 3D pose.

The processor may input a received input image 701 to a pose prediction model 780.

In block 710, the processor may detect a person from the input image 701 using the pose prediction model 780.

In block 720, the processor may crop a body region of interest (ROI) of the person from the image 701 using the pose prediction model 780. The body used herein may be construed as a whole body.

In block 730, the processor may crop a head ROI of the person from the image 701 using the pose prediction model 780.

In block 740, the processor may predict a position of a joint and a body 3D pose, which is a pose of the whole body, from the body ROI using the pose prediction model 780.

In block 750, the processor may predict a head 3D pose, which is a pose of a head, from the head ROI using the pose prediction model 780.

In block 760, the processor may infer face 3D information, which is information about face landmarks, from the head ROI using the pose prediction model 780.

In block 770, the processor may predict the whole-body 3D pose by combining the predicted body 3D pose and the predicted head 3D pose using the pose prediction model 780. The processor may predict the whole-body 3D pose based on a coordinate system of a camera that has captured the image 701. That is, the processor may predict the whole-body 3D pose including perspective projection characteristics based on a coordinate system of an input camera which is the camera that has captured the image 701.

Although not shown in FIG. 7, the processor may crop a both-hand ROI from the image 701 using the pose prediction model 780. The processor may predict a both-hand 3D pose, which is a pose of both hands, from the both-hand ROI using the pose prediction model 780. In this case, in block 770, the processor may predict the whole-body 3D pose by combining the body 3D pose, the head 3D pose, and the both-hand 3D pose by the pose prediction model 780.

In blocks 740 and 750, the pose prediction model 780 may be an orthographic projection-based deep learning model. Therefore, when a pose of the person included in the image 701 is a pose in which the perspective projection characteristics are dominant, there may be an error in the predicted whole-body 3D pose.

Hereinafter, a method of obtaining a normalized image of each part using a normalization camera for each part will be described.

Figure 8:
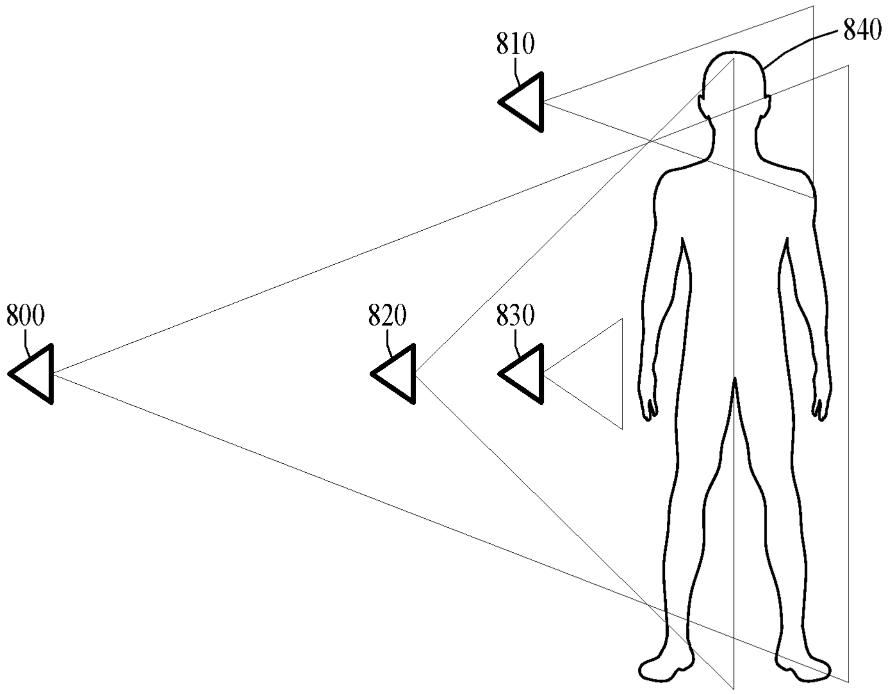

FIG. 8 shows part-specific normalization cameras 810, 820, and 830 and an input camera 800.

Unlike a method of simply cropping an image of each part from an input image under the assumption of orthographic projection, part-specific normalized images may be represented by perspective projection based on a coordinate system of the predefined virtual part-specific normalization cameras 810, 820, and 830 located at certain distances for respective parts. In this case, distances of the part-specific normalization cameras 810, 820, and 830 may be normalized, but rotation directions thereof may not be normalized. When the rotation directions of the part-specific normalization cameras 810, 820, and 830 are normalized, the performance of deep learning may be degraded, and a trained deep learning model may show a single motion characteristic for a specific rotation.

The input camera 800 may be a real camera that has captured an image of a person 840 who is a target to be modeled. The input camera 800 may have a variable distance or position with respect to the person 840.

The part-specific normalization cameras 810, 820, and 830 may be arranged in advance at predetermined distances from the person 840 to include all part-specific information of the person 840. That is, for example, a head normalization camera 810, a whole-body normalization camera 820, and a both-hand normalization camera 830 (FIG. 8 shows only a left-hand normalization camera) may be virtual cameras that are arranged in advance at predetermined distances from a head, a whole body, and both hands, respectively. The part-specific normalization cameras 810, 820, and 830 may normalize a distance but may not normalize a rotation.

However, positions of the part-specific normalization cameras 810, 820, and 830 may vary according to a predicted whole-body 3D pose. For example, the head normalization camera 810 may be arranged at a higher position when the predicted whole-body 3D pose is a pose of bending the waist, than when the predicted whole-body 3D pose is a pose of straightening the waist, but may be arranged at the same distance.

According to an embodiment, when it is necessary to precisely extract part-specific control parameters from part-specific normalized images, the part-specific normalized images to be input to part-specific control parameter prediction models may be configured as a multi-resolution input. A neural rendering model may learn appearance information of a user using an interpolation characteristic. In this case, when the learning is performed on a whole-body image including a face and hands all at once, the neural rendering model may be trained in a way to increase appearance reproduction of a part occupying a large area in the whole body rather than a part (e. g., a face and hands) occupying a small area in the whole body. The part occupying a small area in the whole body may thus be blurred, which may make it difficult to generate a realistic 3D model of a person. Therefore, the part-specific normalized images may be configured as a multi-resolution input using different resolutions for respective parts. That is, a resolution of a part requiring the detection of precise information may be set to be high.

According to an embodiment, a difference between the resolution of the part-specific normalized images input to the part-specific control parameter prediction models and a resolution at which the part-specific control parameter prediction models effectively output parameters may be great by more than a threshold value. In this case, the processor may perform a multi-step transformation to gradually reduce the resolution of the part-specific normalized images input to the part-specific control parameter prediction models.

For example, under the assumption that the resolution of the part-specific normalized images is 1024×1024, and the resolution at which the part-specific control parameter prediction models effectively output the parameters is 256×256, reducing the resolution of the part-specific normalized images to 256×256 all at once may degrade the quality in the case of an inverse transformation into the original resolution of 1024×1024 for part-specific rendered images later. Therefore, adding a process of reducing the resolution to 512×512 in the middle and reducing the resolution of the part-specific normalized images in two steps may minimize the quality degradation in the case of the inverse transformation into the original resolution for the part-specific rendered images using a super-resolution model. Accordingly, in the case of a synthesis of the part-specific rendered images after the inverse transformation, it is possible to render a high-resolution image to be one of high quality while maintaining a capacity of a CNN or MLP network to be small. In this case, a super-resolution learner may be capable of learning through loss to minimize a color error between the part-specific normalized images that are transformed in steps. In addition, even though the resolution is gradually reduced, the overall process may still have a self-supervised end-to-end configuration.

Hereinafter, part-specific normalized images including perspective projection characteristics will be described.

Figure 9:
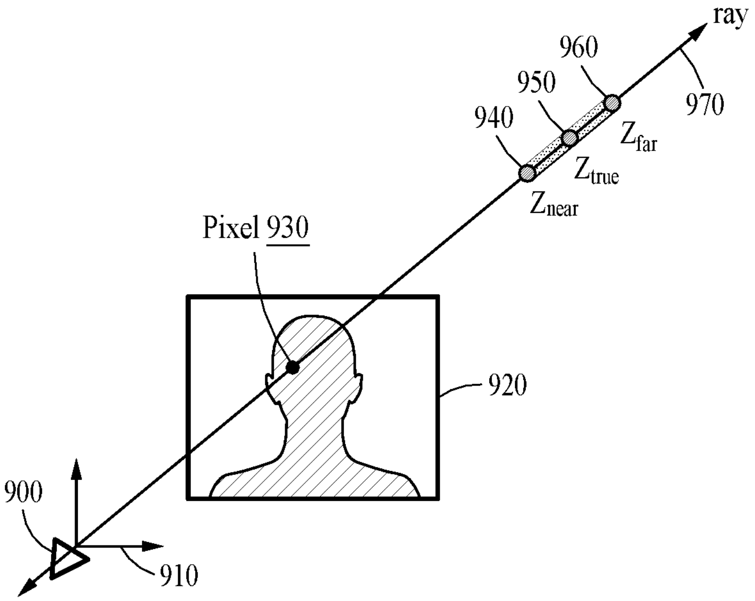

FIG. 9 shows a normalization head image 920 and a head normalization camera 900. A pixel 930 included in the normalized head image 920 may generate a 3D ray 970 that passes through the pixel 930, using an intrinsic camera factor (e.g., focal length, pixel size, etc.) based on a coordinate system 910 of the head normalization camera 900. In this case, infinite points that may be present on the 3D ray 970 may be referred to as 3D points. That is, a 3D point may be a point occupying a real 3D space.

When the 3D points on the 3D ray 970 are projected in perspective, 3D points of a body part that may represent the color of the pixel 930 may be located at $Z_{near}$ 940 to $Z_{far}$ 960. A position with a true value of a 3D point of the body part corresponding to the pixel 930 may be $Z_{true}$ 950.

In the present disclosure, a density may refer to a probability that a 3D point on the 3D ray 970 projected onto the pixel 930 is located in a real space. Accordingly, among the 3D points on the 3D ray 970, the 3D points located at $Z_{near}$ 940 to $Z_{far}$ 960 may have a density of [0, 1]. Specifically, among the 3D points on the 3D ray 970, a density of the 3D point located at $Z_{true}$ 950 may be 1.

The 3D point of the body part located at $Z_{true}$ 950 may be projected onto the pixel 930 through perspective projection using calibration information of the head normalization camera 900.

When a normalized image is generated using a normalization camera, perspective projection characteristics such as a probability that a 3D point representing the color of a pixel (e.g., the pixel 930) is included in a specific range and a position with a true value of a 3D point projected onto the pixel 930 may be maintained.

Therefore, when a deep learning model is trained by simply cropping a specific area of an image, a structural error may occur because the perspective projection characteristics are ignored when an inference result of the deep learning model is reflected in the original image. This error may be greater when perspective projection distortion occurs, for example, when a person included in an image is out of the center of the image or performs a large motion. Accordingly, such an error may degrade the quality of a 3D model of a dynamic object such as a person, compared to a 3D model of a static object such as a background or a fixture.

According to an embodiment, a 3D model may be generated based on part-specific normalized images including perspective projection characteristics using part-specific normalization cameras, and thus the foregoing issues may be solved. Hereinafter, a method of outputting a control parameter for each part using a normalized image of each part will be described.

Figure 10:
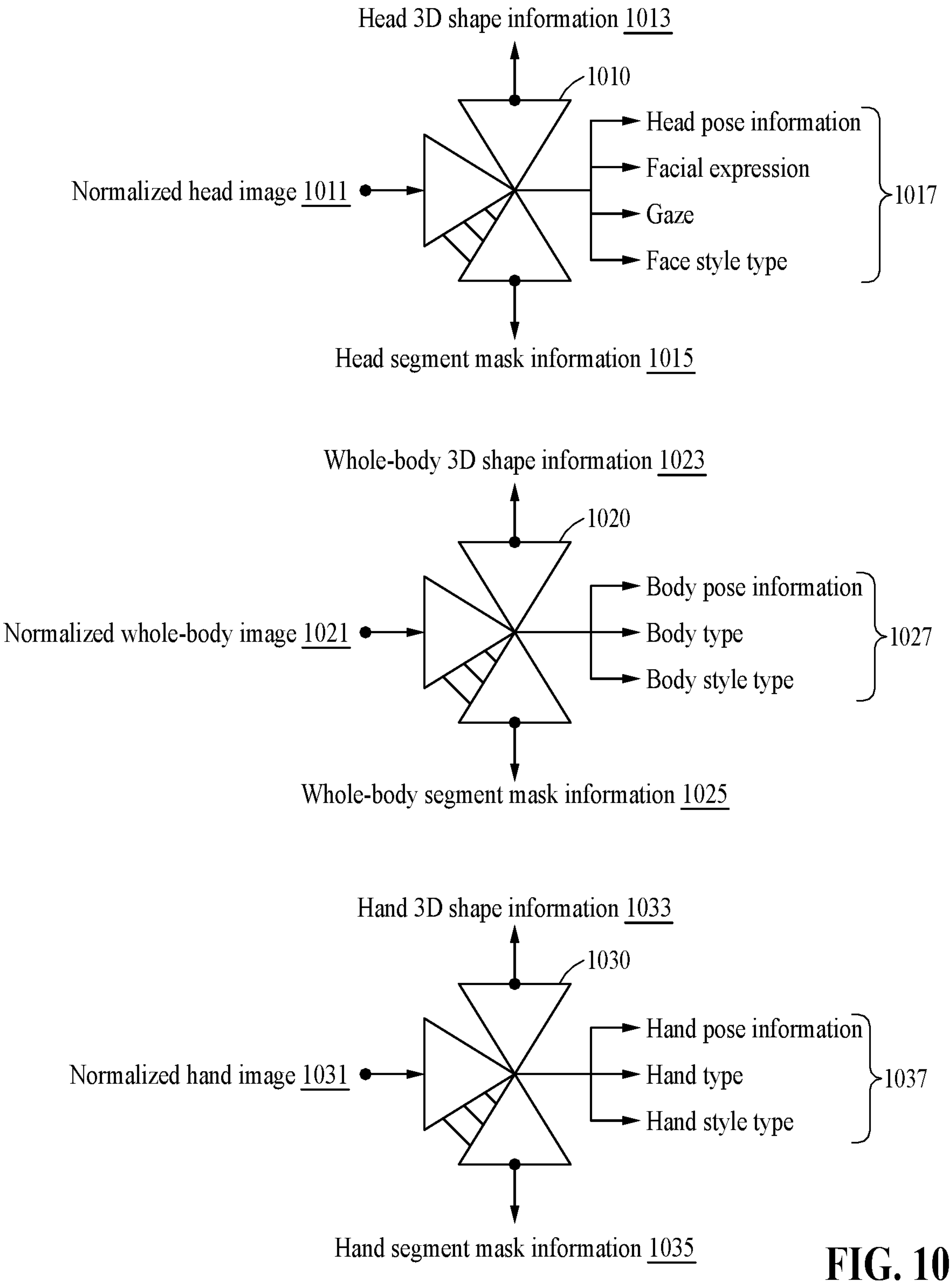
FIG. 10 is a diagram illustrating a method of outputting a control parameter for each part according to an embodiment of the present disclosure.

FIG. 10 is a diagram illustrating a method of outputting a control parameter for each part according to an embodiment of the present disclosure.

FIG. 10 shows part-specific control parameter prediction models 1010, 1020, and 1030. The part-specific control parameter prediction models 1010, 1020, and 1030 may include a head control parameter prediction model 1010, a whole-body control parameter prediction model 1020, and a hand control parameter prediction model 1030. The part-specific control parameter prediction models 1010, 1020, and 1030 may be of a CNN-based deep learning network structure. Accordingly, the part-specific control parameter prediction models 1010, 1020, and 1030 may have a similar structure.

The part-specific control parameter prediction models 1010, 1020, and 1030 may each include an encoder that extracts features from a normalized image of each part (e.g., part-specific normalized images 1011, 1021, and 1031). The part-specific control parameter prediction models 1010, 1020, and 1030 may each include a 3D shape information outputter, a segment mask information outputter, and an appearance control parameter outputter that output necessary information using the extracted features.

The 3D shape information outputter may output 3D shape information about the shape of each part. The segment mask information outputter may output segment mask information, which is information indicating which part of a body (e.g., eyes, nose, mouth, hair, etc.) corresponds to individual pixels of a normalized image. The appearance control parameter outputter may output appearance control parameters that are feature information (e.g., pose, facial expression, gaze, etc.) for each part representing the appearance of each part of a person included in an image. The appearance control parameter outputter may be in the form of a fully connected layer (FClayer). The part-specific control parameter prediction models 1010, 1020, and 1030 may be pre-trained for each part.

In addition to the structure of the part-specific control parameter prediction models 1010, 1020, and 1030 described above, a network structure such as a transformer that outputs the same information may be used.

The part-specific control parameter prediction models 1010, 1020, and 1030 may receive the part-specific normalized images 1011, 1021, and 1031 respectively corresponding to the part-specific control parameter prediction models 1010, 1020, and 1030. The part-specific control parameter prediction models 1010, 1020, and 1030 may output part-specific control parameters from the part-specific normalized images 1011, 1021, and 1031, respectively.

The part-specific control parameters may include a head control parameter for controlling a head, a whole-body control parameter for controlling a whole body, and a hand control parameter for controlling hands.

Specifically, the part-specific control parameters may include part-specific 3D shape information 1013, 1023, and 1033 (which is information associated with the shape of respective parts), part-specific segment mask information 1015, 1025, and 1035 each indicating a part corresponding to a 3D point actually occupying a space, and part-specific appearance control parameters 1017, 1027, and 1037 representing the appearance of respective parts of a person.

For example, the head control parameter may include head 3D shape information 1013, head segment mask information 1015, and head appearance control parameter 1017. The whole-body control parameter may include whole-body 3D shape information 1023, whole-body segment mask information 1025, and whole-body appearance control parameter 1027. The hand control parameter may include hand 3D shape information 1033, hand segment mask information 1035, and hand appearance control parameters 1037.

The part-specific appearance control parameters 1017, 1027, and 1037 may be control information representing an appearance deformation specific to respective parts. For example, the head appearance control parameter 1017 may include control information for expression and gaze. However, the control information included in the part-specific appearance control parameters 1017, 1027, and 1037 shown in FIG. 10 are provided merely as an example, and all control information that may change an appearance of a 3D model of a person which is a final result may be included in the part-specific appearance control parameters 1017, 1027 and 1037. The part-specific appearance control parameters 1017, 1027, and 1037 may be used to learn features of the appearance of respective parts specific to part-specific neural rendering models. Accordingly, an appearance control parameter for each part may be used to control the appearance of a 3D human model.

The segment mask information may be used by a neural rendering model to learn which part of the body corresponds to a 3D point actually occupying a space. In addition, the segment mask information may be used to determine priorities in the synthesis of part-specific rendered images.

The 3D shape information may be used to predict a distance to a position (i.e., $Z_{true}$) having a true value of a 3D point projected onto a pixel of a normalized image of each part during neural rendering. In addition, 3D shape information may be used to set a range of $Z_{near}$ and $Z_{far}$ in the generation of a rendered image of each part.

A style type in each of the part-specific appearance control parameters 1017, 1027, and 1037 may be configured to facilitate the control of a 3D human model, which is a final result, after learning of the neural rendering model is completed. For example, a face style type may be a concatenation of elements for controlling a 3D model of a person, such as, hairstyle, skin tone, glasses style, mask style, earring style, age, gender, and race, in a concatenation format. In this example, for (eye)glasses, earrings, and masks may be set to distinguish whether they are worn, in addition to their style. Also, gaze information of the head appearance control parameter 1017 may be information based on a face coordinate system. Through this, the gaze of a 3D model of a person may be intuitively controlled.

Figure 11:
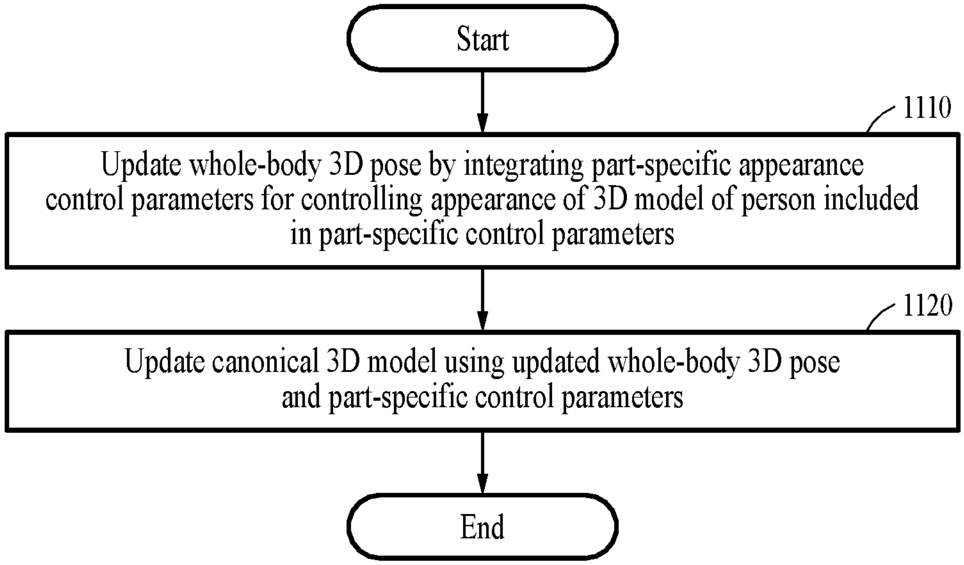
FIGS. 11 to 13 are diagrams illustrating a method of generating a canonical 3D model based on a control parameter for each part according to an embodiment of the present disclosure.
Figure 12:
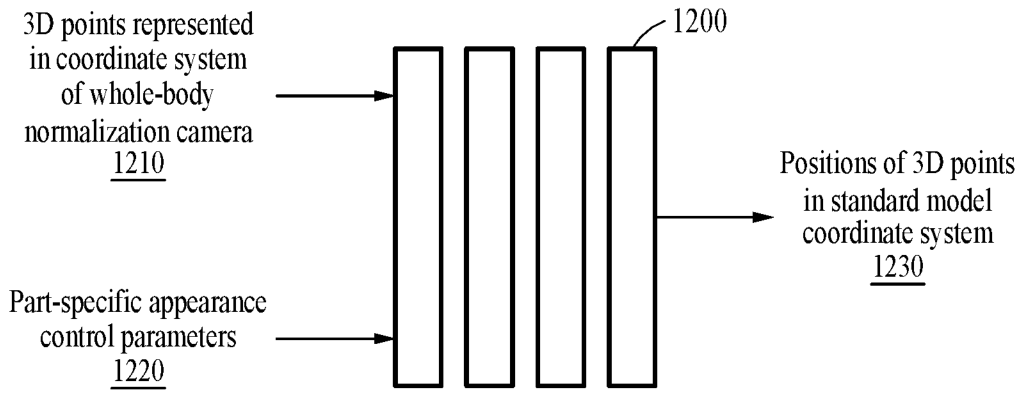
Figure 13:
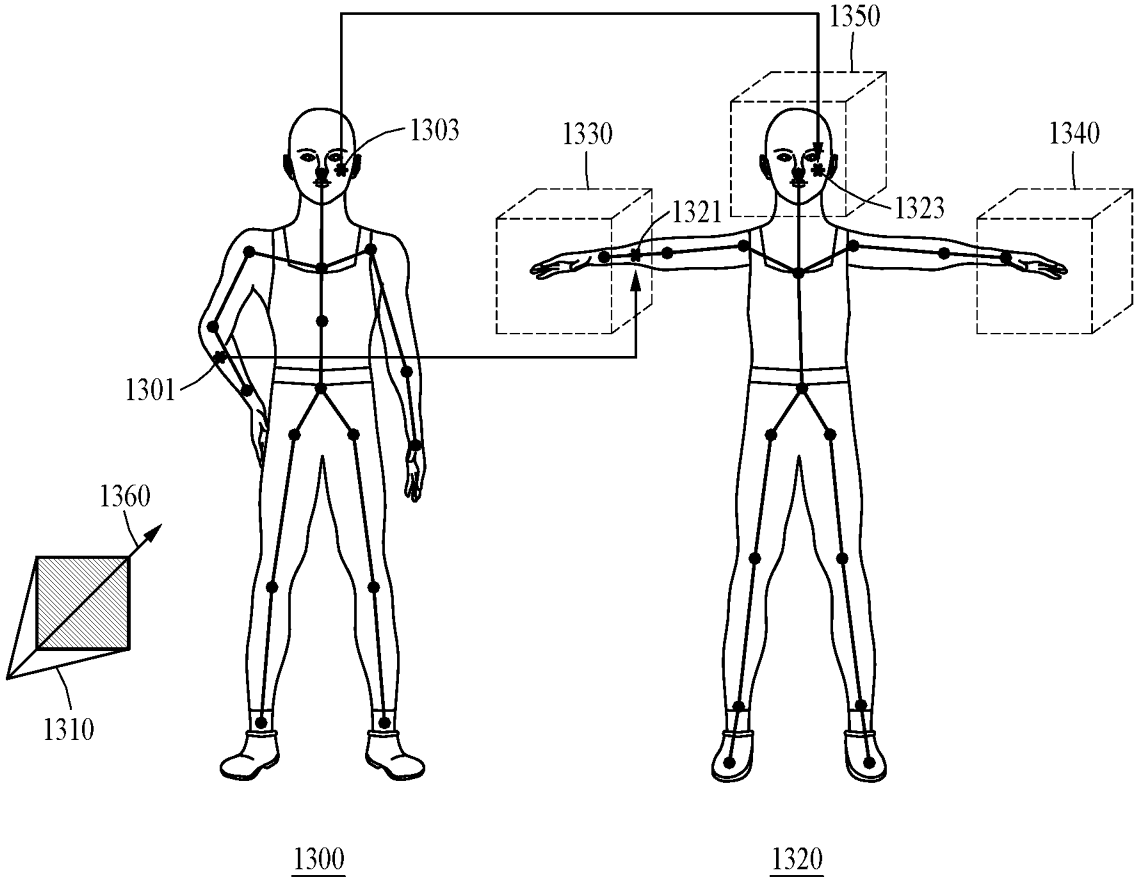

FIGS. 11 to 13 are diagrams illustrating a method of generating a canonical 3D model based on a control parameter for each part according to an embodiment of the present disclosure.

Operations to be described below may be performed in sequential order but not necessarily performed in sequential order. For example, the order of the operations may be changed and at least two of the operations may be performed in parallel. Operations 1110 and 1120 may be performed by a processor (e.g., the processor 110), but examples are not limited thereto.

In operation 1110, the processor may update a whole-body 3D pose by integrating part-specific appearance control parameters that are included in parts-specific control parameters and control an appearance of a 3D model of a person.

The processor may transform each piece of part-specific pose information included in the part-specific appearance control parameters into a coordinate system of a whole-body normalization camera among part-specific normalization cameras that capture normalized images of respective parts.

The processor may update a whole-body 3D pose in the coordinate system of the whole-body normalization camera by integrating pieces of pose information transformed into the coordinate system of the whole-body normalization camera.

In operation 1120, the processor may update the canonical 3D model using the updated whole-body 3D pose and the part-specific control parameters.

The processor may update the canonical 3D model by transforming 3D points of a body represented in the coordinate system of the whole-body normalization camera into a coordinate system in which the canonical 3D model is represented and accumulating them in the canonical 3D model. The processor may generate the canonical 3D model using a volume transformation model.

The transformation into the coordinate system of the whole-body normalization camera may be performed by a 4×4 matrix operation of a 3D rotation and translation between coordinate systems. Transforming each piece of part-specific pose information into the coordinate system of the whole-body normalization camera may represent a whole-body 3D pose in a standardized space of a constant physical size. Accordingly, a single volume transformation model may learn part-specific control parameters for people having different physical conditions.

FIG. 12 shows a volume transformation model for generating a canonical 3D model.

The processor may update a canonical 3D model using a whole-body 3D pose represented in a coordinate system of a whole-body normalization camera and part-specific appearance control parameters.

In this case, the part-specific appearance control parameters may include a body type (i.e., information representing a shape feature of a naked body including, e.g., an obese type, a large upper body type, etc.), a body style type (i.e., information representing a shape feature of upper and lower clothing including, e.g., short-sleeved shirts, short pants, etc.), a face style type (i.e., information representing a shape feature of a head including, e.g., gender, age, hairstyle, (eye)glasses, etc.), and the like.

The processor may generate a canonical 3D model by transforming 3D points of a body that define an outward appearance of a person into a canonical model coordinate system in which a canonical 3D model is represented. The canonical model coordinate system may be a coordinate system in which the size and pose of a canonical 3D model in which appearance information is accumulated are predefined.

That is, for example, each time different images of a person to be modeled are newly input to a 3D model generator, appearance information of the person included in the input images may be accumulated in a canonical 3D model, and the canonical 3D model may thereby be updated. The different images described above may be images obtained by capturing an image of a person to be modeled from different views or images obtained by capturing an image of a person to be modeled in different poses. For example, the different images may be successive images of a person in motion.

The canonical 3D model may be a model that represents an outward appearance of a person in a static state with a fixed pose and size without a movement, such as a T-pose or A-pose. Therefore, even when an image in which an appearance of a person is deformed by a motion, a facial expression, and a gaze movement of the person is input to the 3D model generator, this appearance deformation may be inversely compensated for and represented in the canonical 3D model. That is, for example, when an image of appearance deformation occurring by a motion of a person is sequentially input to the 3D model generator, the processor may accumulate information on the appearance deformation into the canonical 3D model. By inversely compensating for and accumulating a motion, a canonical 3D model in a static state that is required for learning a neural rendering model may be obtained.

Typically, a method using 3D poses of major joints included in a whole body, such as 3D openpose, or a method using naked body shape information, such as, a skinned multi-person linear model (SMPL), may be used to generate a canonical 3D model. However, these methods may not readily render a person of a style that is different in topology with a naked body shape because of wearing of clothing such as a skirt.

FIG. 12 shows a volume transformation model 1200 for generating a canonical 3D model.

The volume transformation model 1200 may be trained to generate a canonical 3D model by accumulating, in an appearance model, 3D points 1210 represented in a coordinate system of a whole-body normalization camera, using a corresponding relationship between the 3D points 1210 represented in the coordinate system of the whole-body normalization camera and 3D points of the canonical 3D model in a canonical model coordinate system. The 3D points 1210 represented in the coordinate system of the whole-body normalization camera may form a surface of a rigged 3D model using a 3D scan-based data set using part-specific appearance control parameters.

In addition, the volume transformation model 1200 may be trained using a corresponding relationship between normal vectors of the 3D points 1210 represented in the coordinate system of the whole-body normalization camera and normal vectors of the 3D points constituting the canonical 3D model in the canonical model coordinate system. The normal vectors described herein may be vectors of inward and/or outward directions of 3D points.

The volume transformation model 1200 may receive, as an input, the 3D points 1210 represented in the coordinate system of the whole-body normalization camera and part-specific appearance control parameters 1220, and output positions 1230 of 3D points in the canonical model coordinate system corresponding to the 3D points 1210 represented in the coordinate system of the whole-body normalization camera. That is, as the positions 1230 of the 3D points in the canonical model coordinate system are output, transformed 3D points may be accumulated at corresponding positions and a canonical 3D model may thereby be generated.

Each input of the volume transformation model 1200 may include a combination of numbers enabling positional encoding. The volume transformation model 1200 may be in an MLP structure, which may be only an example, and examples are not limited thereto.

According to an embodiment, the processor may generate a template model by matching a mesh-based naked 3D template model, a mesh-based 3D clothing model, and an accessory model respectively corresponding to a body type, a body style type, and a face style type of part-specific control parameters from a previously formed database (DB). The processor may generate a canonical 3D model by transforming the generated template model. The accessory model may be a model of hair, glasses, a mask, and the like. In the mesh-based naked 3D template model and the mesh-based 3D clothing model, positions of vertices may be interlocked with a whole-body 3D pose model including skeletal articulated joints to which a whole-body 3D pose is applied, according to a rotation or movement of each joint through a rigging process.

The processor may perform non-linear deformation on an appearance of the template model by applying the updated whole-body 3D pose to the template model. The processor may generate the canonical 3D model by transforming 3D points of the nonlinearly deformed template model into the canonical model coordinate system.

That is, for example, a canonical 3D model assuming a predetermined pose of T-pose, A-pose, or X-pose may be updated by accumulating 3D points of a template model in the canonical 3D model. That is, the canonical 3D model may represent only an appearance of a user, with a movement excluded.

According to an embodiment, the canonical 3D model may be generated by performing a transformation between coordinate systems of clothing or hair that is not dependent on the topology of a human body without an explicit 3D model such as the naked 3D template model and the 3D clothing model described above.

The canonical 3D model represented in the canonical model coordinate system may be generated because a whole body of a person may be consistently represented in a single static space.

After updating the canonical 3D model, the processor may control the canonical 3D model based on control information received from a user for controlling a 3D model of a person which is a final output. The control information may include camera view control information about a camera view at which a 3D model of a person is to be displayed, pose control information for the 3D model, and style control information for the 3D model.

For example, the processor may control the canonical 3D model assuming the T-pose to assume X-pose according to the pose control information indicating X-pose received from the user. The processor may generate part-specific neural rendering models corresponding to the controlled canonical 3D model based on the control information input from the user.

Specifically, a method of generating a canonical 3D model will be described in detail below with reference to FIG. 13.

FIG. 13 shows a whole-body model 1300 displayed in a coordinate system of a whole-body normalization camera 1310 and a T-pose canonical 3D model 1320. The whole-body model 1300 may include 3D points represented in the coordinate system of the whole-body normalization camera 1310. A viewing direction 1360 may be a direction of a view of the whole-body normalization camera 1310.

A volume transformation model may transform 3D points 1301 and 1303 of the whole-body model 1300 into 3D points 1321 and 1323 of the canonical 3D model 1320 represented in a canonical model coordinate system. The canonical model coordinate system in which the canonical 3D model 1320 is represented may be a space in which a pose and a size of a model are defined in advance.

All 3D points transformed into the canonical model coordinate system through the volume transformation model may be used as an input for learning of neural rendering models of parts respectively corresponding to the 3D points. That is, for example, 3D points transformed into a head region 1350 and both hand regions 1330 and 1340 in the canonical model coordinate system may be used to train a head neural rendering model and a both-hand neural rendering model, respectively. For example, the 3D point 1323 transformed into the head region 1350 may be transmitted as an input to train the head neural rendering model.

However, the 3D points transformed into the head region 1350 and the both-hand regions 1330 and 1340 are also included in a whole-body region, and they may thus be transmitted as an input even to train a whole-body neural rendering model. This is for a natural synthesis of a result from the head neural rendering model and a result from the whole-body rendering model when synthesizing part-specific neural rendering models.

Also, it is apparent to one of ordinary skill in the art that neural rendering models of other parts are also trained as needed in addition to the whole-body, head, and both-hand neural rendering models.

Hereinafter, a method of generating part-specific rendered images by training part-specific neural rendering models will be described.

Figure 14:
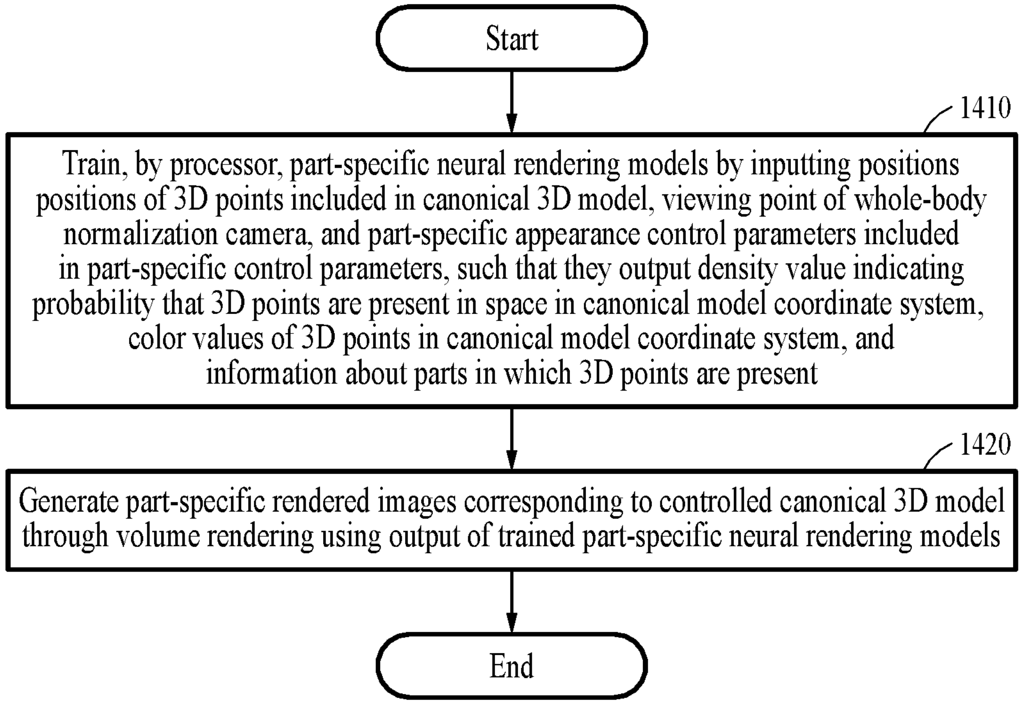
FIGS. 14 and 15 are diagrams illustrating a method of generating a rendered image of each part according to an embodiment of the present disclosure.
Figure 15:
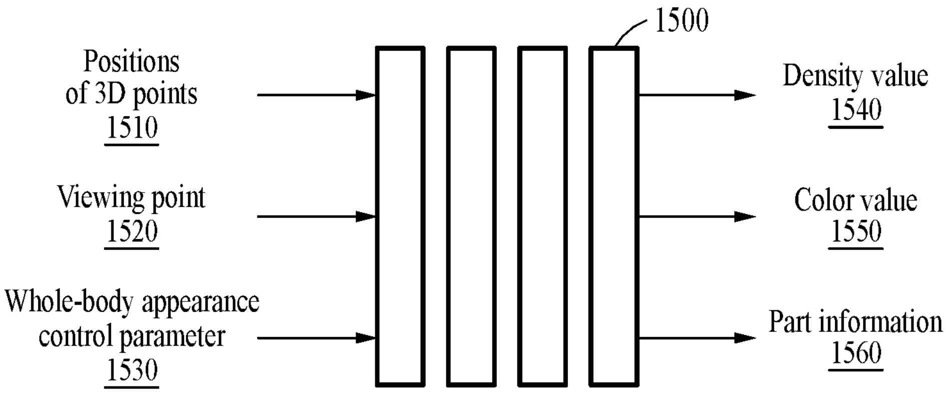

FIGS. 14 and 15 are diagrams illustrating a method of generating a rendered image of each part according to an embodiment of the present disclosure.

Operations to be described below may be performed in sequential order but not necessarily performed in sequential order. For example, the order of the operations may be changed and at least two of the operations may be performed in parallel. Operations 1410 and 1420 may be performed by a processor (e.g., the processor 110), but examples are not limited thereto.

In operation 1410, the processor may train part-specific neural rendering models by inputting positions of 3D points included in a canonical 3D model, a viewing point of a whole-body normalization camera, and part-specific appearance control parameters included in part-specific control parameters, such that they output density values indicating probabilities that the 3D points are present in a space in a canonical model coordinate system, color values of the 3D points in the canonical model coordinate system, and information about parts in which the 3D points are present.

Additionally, the neural rendering models may be trained to output position values of joints and position values of face landmarks according to purposes.

The part-specific neural rendering models may include a head neural rendering model, a whole-body neural rendering model, and a both-hand neural rendering model.

The part-specific neural rendering models may be trained using an MLP network. However, the part-specific neural rendering models may be trained using various deep learning network structures such as a CNN according to details and outputs for respective parts of a body.

In operation 1420, the processor may generate part-specific rendered images corresponding to a canonical 3D model controlled through volume rendering using the output of the trained part-specific neural rendering models. That is, the processor may generate the part-specific rendered images corresponding to a viewing point, a pose, and a style of the controlled canonical 3D model.

For example, when the controlled canonical 3D model assumes a pose of bending the waist, a generated rendered whole-body image may also assume a pose of bending the waist. For another example, when a face of the controlled canonical 3D model is winking, a generated rendered head image may also be winking.

The part-specific rendering models may generate a 3D ray that passes through a pixel to be rendered, with respect to a whole-body normalization camera. The processor may sample a minimum distance $Z_{near}$ and a maximum distance $Z_{far}$ with a regular interval therebetween where a 3D point representing the color of the corresponding pixel is predicted to exist on the 3D ray. The processor may extract 3D points at regular sampling intervals. The processor may determine a pixel value by synthesizing a density value and a color value of an extracted 3D point.

In this case, information about a part where the 3D points exist may indicate to which part a pixel of the synthesized pixel value belongs.

Accordingly, the processor may generate the part-specific neural rendering models including pixels having the synthesized pixel value.

The part-specific rendered images may be generated from the neural rendering models respectively corresponding thereto. For example, a head neural rendering model may output a rendered head image. A whole-body neural rendering model may output a rendered whole-body image. A both-hand neural rendering model may output a rendered both-hand image.

According to an embodiment, when a multi-step transformation is performed on part-specific normalized images, the processor may also perform the multi-step transformation on a result generated through volume rendering to increase resolution. In this case, a CNN-based super-resolution model may be used, similarly to the multi-step transformation on the part-specific normalized images. The super-resolution model may be trained through self-supervised learning to minimize the quality degradation that may occur in a process of increasing the resolution.

FIG. 15 shows a whole-body neural rendering model 1500 among part-specific neural rendering models. The following description of the whole-body neural rendering model 1500 may also be applicable to other neural rendering models (e.g., a head neural rendering model and a both-handed neural rendering model).

The whole-body neural rendering model 1500 may receive, as an input, positions 1510 of 3D points included in a canonical 3D model, a viewing point (or direction) 1520 of a whole-body normalization camera, and a whole-body appearance control parameter 1530. The head neural rendering model may receive, as an input, the positions 1510 of the 3D points, the viewing point 1520 of the whole-body normalization camera, and a head appearance control parameter. The both-hand neural rendering model may receive, as an input, the positions 1510 of the 3D points, the viewing point 1520 of the whole-body normalization camera, and a both-hand appearance control parameter. That is, the positions 1510 of the 3D points and the viewing point 1520 of the whole-body normalization camera may be a common input to the part-specific neural rendering models.

However, an appearance control parameter to be input may be different depending on a neural rendering model for each part. For example, the whole-body neural rendering model 1500 may receive the whole-body appearance control parameter 1530 as an input, but the head neural rendering model and the both-hand neural rendering model may receive the head appearance control parameter and the both-hand appearance control parameter as their respective inputs.

The whole-body neural rendering model 1500 may be trained to output a density value 1540 indicating a probability that 3D points are present in an arbitrary space in a canonical model coordinate system in response to the inputs 1510, 1520, and 1530.

The whole-body neural rendering model 1500 may be trained to output a color value 1550 of the 3D points in the canonical model coordinate system in response to the inputs 1510, 1520, and 1530.

The whole-body neural rendering model 1500 may be trained to output information 1560 about a part where the 3D points exist in response to inputs 1510, 1520, and 1530.

Hereinafter, a method of synthesizing part-specific rendered images will be described. FIG. 16 is a diagram illustrating synthesis of part-specific rendered images according to an embodiment of the present disclosure.

Figure 16:
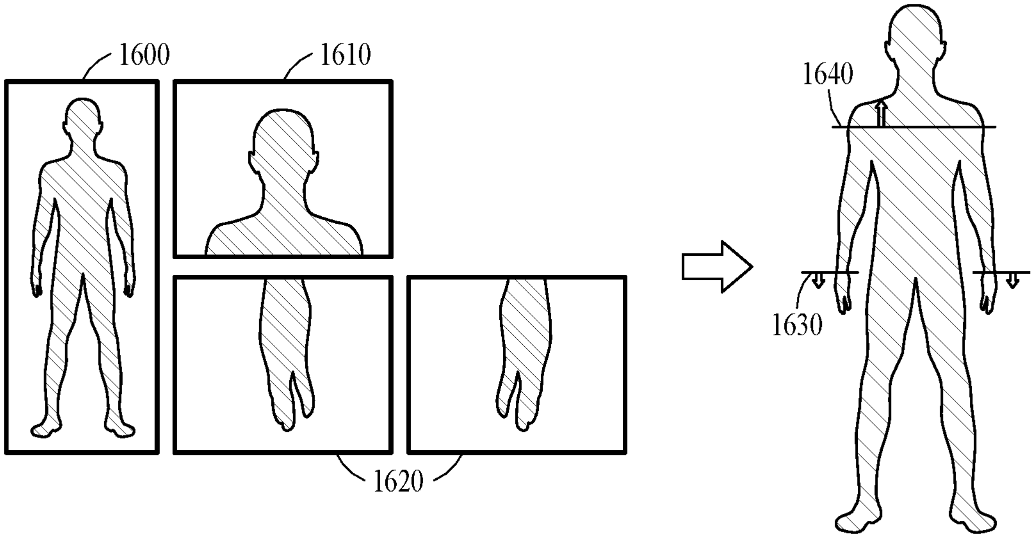
FIG. 16 is a diagram illustrating synthesis of part-specific rendered images according to an embodiment of the present disclosure.

FIG. 16 shows part-specific rendered mages including a rendered whole-body image 1600, a rendered head image 1610, and a rendered both-hand image 1620. A 3D model 1650 of a person may be generated through a synthesis of the part-specific rendered images.

The processor may control a canonical 3D model according to a control command and generate the part-specific rendered images corresponding to the controlled canonical 3D model. The processor may generate the 3D model 1650 of the person, which is a final output, by synthesizing the part-specific rendered images.

That is, the processor may control the canonical 3D model 1650 according to a control command input from a user and synthesize the generated part-specific rendered images based on the controlled canonical 3D model.

When synthesizing the part-specific rendered images, a weight may be determined for each part for natural synthesis. In this case, a rendered image having a great weight may be preferentially used in the synthesis. For example, part-specific rendered images (e.g., the rendered head image 1610 and the rendered both-hand image 1620) other than the rendered whole-body image 1600 may be determined to have a greater weight than that of the rendered whole-body image 1600 during the synthesis. Since the part-specific rendered images other than the rendered whole-body image 1600 include more detailed information, a greater weight than that of the rendered whole-body image 1600 may be determined for the other part-specific rendered images. For example, although the rendered whole-body image 1600 also includes a head portion, the rendered head image 1610 includes more detailed information about the portion, and thus the weight of the rendered head image 1610 may be determined to be greater.

In addition, in such a process of synthesizing the part-specific rendered images, there may be boundary portions 1630 and 1640 at which the part-specific rendered images overlap. In this case, for pixels in part-specific rendered images (e.g., the rendered head image 1610 and the rendered both-hand image 1620) other than the rendered whole-body image 1600, which are in the boundary portions 1630 and 1640, a weight may be determined according to a degree of closeness to each portion.

Specifically, a weight of pixels of the rendered head image 1610 located near the boundary portion 1640 where the rendered whole-body image 1600 and the rendered head image 1610 overlap each other may be determined to be greater than a weight of overlapping pixels of the rendered whole-body image 1600 as the pixels are closer in a direction of a head. Also, a weight of pixels of the rendered both-hand image 1630 located on the boundary portion 1630 where the rendered whole-body image 1600 and the rendered both-hand image 1620 overlap each other may be determined to be greater than a weight of overlapping pixels of the rendered whole-body image 1600 as the pixels are closer in a direction of both hands (i.e., hand tips).

Figure 17:
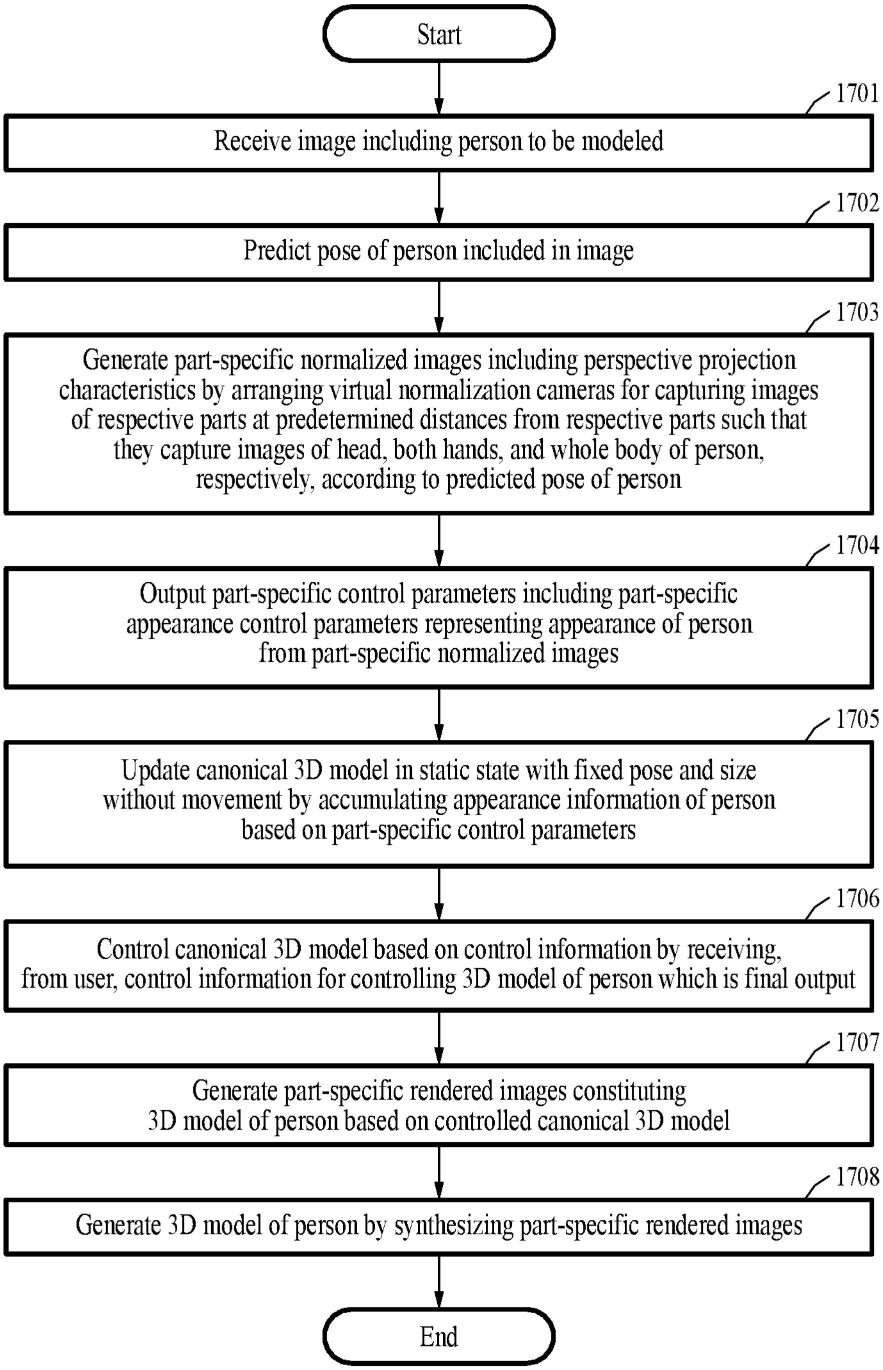
FIG. 17 is a flowchart illustrating a method of operating an electronic device according to an embodiment of the present disclosure.

FIG. 17 is a flowchart illustrating a method of operating an electronic device according to an embodiment of the present disclosure.

Operations to be described below may be performed in sequential order but not necessarily performed in sequential order. For example, the order of the operations may be changed and at least two of the operations may be performed in parallel. Operations 1701 to 1708 may be performed by a processor (e.g., the processor 110), but examples are not limited thereto.

In operation 1701, the processor may receive an image including a person who is a target to be modeled.

In operation 1702, the processor may predict a pose of the person included in the image.

In operation 1703, the processor may generate part-specific normalized images including perspective projection characteristics by arranging virtual normalization cameras for capturing images of respective parts at predetermined distances from the respective parts such that they capture images of a head, both hands, and a whole body of the person, respectively, according to the predicted pose of the person.

In operation 1704, the processor may output part-specific control parameters including part-specific appearance control parameters representing an appearance of the person from the part-specific normalized images.

In operation 1705, the processor may update a canonical 3D model in a static state with a fixed pose and size without a movement by accumulating appearance information of the person based on the part-specific control parameters.

In operation 1706, the processor may receive, from a user, control information for controlling a 3D model of the person which is a final output, and control the canonical 3D model based on the control information.

The control information may include camera view control information about a camera view at which the 3D model of the person is to be displayed, pose control information for the 3D model, and style control information for the 3D model.

In operation 1707, the processor may generate part-specific rendered images constituting the 3D model of the person based on the controlled canonical 3D model.

In operation 1708, the processor may generate the 3D model of the person by synthesizing the part-specific rendered images.

In the present disclosure, the pose prediction model 780, the part-specific control parameter prediction models 1010, 1020, and 1030, the volume transformation model 1200, and the part-specific neural rendering models may each be a model that has a plurality of parameters requiring to be learned through deep learning. The models described above may be in a form in which multi-level artificial intelligence (AI) learning networks with multiple purposes are combined in a pipeline format. Therefore, for the efficiency and stability of learning of individual models, the models may be first individually trained using input and output factors of each individual model. After the individual learning is completed, in an AI learning process, a 3D model of a corresponding person in input image and pixel units, through a final pipeline. Each model may also be trained by self-supervised AI end-to-end such that a color error between the input image and the 3D model of the person which is a final output is minimized or reduced.

In the AI learning process that reproduces the input image at various views of normalization cameras, 3D modeling for the input image may be internally performed on the part-specific control parameter prediction models 1010, 1020, and 1030, the volume transformation model 1200, and the part-specific neural rendering models. In this case, information used in such 3D modeling may be stored in the part-specific neural rendering models for respective parts of a body. To express as in a typical mesh-based 3D model, the stored information may be transformed through an octree-based volume, and then voxel information may be used or meshed to be used.

A typical neural rendering model may not reflect the factors that cause appearance deformation when being trained, and thus a quality of a rendered 3D model may be poor. The quality of the rendered 3D model may be poor due to a structural difference induced by the contradiction in a projection method between 3D space information and 2D image information based on an orthographic projection that is not a perspective projection described herein. The typical neural rendering model may use only a single image including a whole body of a person, and thus the quality of the rendered 3D model may be poor due to MLP learning that is biased toward detailed parts such as a face and hands.

However, the present disclosure may overcome such limitations described above. According to embodiments of the present disclosure, learning efficiency of a neural rendering model may be maximized through learning using part-specific control parameters output from part-specific normalized images that maintain perspective projection characteristics. In addition, part-specific appearance control parameters, which are a factor that may cause part-specific appearance deformation, may be used to be learned by a neural rendering model, and thus a detailed or precise 3D human model may be restored. According to embodiments of the present disclosure, the learning of the neural rendering model may be performed based on part-specific rendered images rather than a single image, detailed parts such as a face and hands may be possible to express.

The method according to embodiments of the present disclosure may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine-readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program may include, for example, both general and special purpose microprocessors, and any one or more processors of any kind of digital computer. Generally, a processor may receive instructions and data from a read-only memory (ROM) or a random-access memory (RAM), or both. Elements of a computer may include at least one processor for executing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, for example, magnetic media such as hard disks, floppy disks, and magnetic tape, optical media such as compact disc ROMs (CD-ROMs) or digital versatile discs (DVDs), magneto-optical media such as floptical disks, ROMs, RAMs, flash memories, erasable programmable ROMs (EPROMs), or electrically erasable programmable ROMs (EEPROMs). The processor and the memory may be supplemented by or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Moreover, although features may be described above as acting in specific combinations and even initially claimed as such, one or more features from a claimed combination can in some cases be excised from the combination, and the claimed combination may be changed to a sub-combination or a modification of a sub-combination.

Likewise, although operations are described in a predetermined order in the drawings, it should not be construed that the operations need to be performed sequentially or in the predetermined order, which is illustrated to obtain a desirable result, or that all the shown operations need to be performed. In specific cases, multi-tasking and parallel processing may be advantageous. In addition, it should not be construed that the separation of various device components of the embodiments described herein is required in all types of embodiments, and it should be understood that the described program components and devices are generally integrated as a single software product or packaged into a multi-software product.

The embodiments described in the present specification and the drawings are intended merely to present specific examples in order to aid in understanding of the present disclosure, but are not intended to limit the scope of the present disclosure. It will be apparent to one of ordinary skill in the art that various modifications based on the technical spirit of the present disclosure, as well as the disclosed embodiments, can be made.

What is claimed is:

1. A method of operating an electronic device, comprising:

receiving an image that is captured from an input camera of the electronic device and comprises a person who is a target to be modeled;

predicting a whole-body 3D pose representing a pose of the person from the image by cropping respective parts from the image, predicting 3D poses of the respective parts and combining the 3D poses of the respective parts;

arranging, based on the whole-body 3D pose, virtual normalization cameras corresponding to the respective parts at predetermined distances from the respective parts;

generating, from the image, part-specific normalized images that comprise perspective projection characteristics for respective parts constituting a body of the person by capturing images of the respective parts using the virtual normalization cameras;

outputting part-specific control parameters comprising part-specific appearance control parameters representing an appearance of the person from the part-specific normalized images that preserve the perspective projection characteristics;

updating a canonical three-dimensional (3D) model in a static state with a fixed pose and size without a movement by accumulating appearance information of the person based on the part-specific control parameters;

receiving control information for controlling a 3D model of the person, which is a final output, from a user and controlling the canonical 3D model based on the control information, wherein the control information comprises camera view control information about a camera view at which the 3D model of the person is to be displayed, pose control information for the 3D model of the person, and style control information for the 3D model of the person;

generating part-specific rendered images constituting the 3D model of the person based on the controlled canonical 3D model; and generating a photorealistic 3D model of the person by synthesizing the part-specific rendered images, wherein the part-specific rendered images comprise:

a rendered head image, a rendered both-hand image, and a rendered whole-body image corresponding to the part-specific normalized images, wherein the generating the photorealistic 3D model of the person by synthesizing the part-specific rendered images comprises:

determining, for use in synthesizing the part-specific rendered images, a weight for each of the rendered whole-body image, the rendered head image, and the rendered both-hand image; and generating the photorealistic 3D model by synthesizing the rendered whole-body image, the rendered head image, and the rendered both-hand image based on the weight of each of the rendered whole-body image, the rendered head image, and the rendered both-hand image, wherein a higher weight is determined for the rendered head image and the rendered both-hand image that includes more detailed information compared to the rendered whole-body image.

2. The method of claim 1, wherein the generating the part-specific normalized images comprising the perspective projection characteristics comprises:

predicting a whole-body 3D pose representing a pose of the person based on a coordinate system of a camera capturing the image; and generating the part-specific normalized images based on the whole-body 3D pose.

3. The method of claim 2, wherein the predicting the whole-body 3D pose comprises:

predicting positions and poses of joints of a whole body of the person;

predicting a pose of a head of the person;

predicting a pose of both hands of the person; and predicting the whole-body 3D pose based on the coordinate system by combining the positions and poses of the joints, the pose of the head, and the pose of both hands with respect to the whole body.

4. The method of claim 2, wherein the generating the part-specific normalized images based on the whole-body 3D pose comprises:

arranging the virtual normalization cameras for capturing images of the respective parts at positions separated from the respective parts by predetermined distances to capture images of a head, both hands, and a whole body, respectively, using the whole-body 3D pose; and generating the part-specific normalized images comprising the perspective projection characteristics, using the virtual normalization cameras capturing the images of the respective parts.

5. The method of claim 1, wherein the part-specific normalized images comprise a normalization head image, a normalized both-hand image, and a normalized whole-body image obtained through the virtual normalization cameras capturing images of the respective parts constituting the body.

6. The method of claim 1, wherein the outputting the part-specific control parameters comprises:

inputting, to part-specific control parameter prediction models, the part-specific normalized images corresponding to the part-specific control parameter prediction models, and outputting the part-specific control parameters comprising the part-specific appearance control parameters representing the appearance of the person.

7. The method of claim 1, wherein the updating the canonical 3D model comprises:

updating a whole-body 3D pose by integrating the part-specific appearance control parameters representing the appearance of the person, comprised in the part-specific control parameters; and updating the canonical 3D model using the updated whole-body 3D pose and the part-specific control parameters.

8. The method of claim 7, wherein the updating the whole-body 3D pose comprises:

transforming part-specific pose information comprised in the part-specific appearance control parameters into a coordinate system of a whole-body normalization camera among part-specific normalization cameras capturing the part-specific normalized images; and updating the whole-body 3D pose in the coordinate system of the whole-body normalization camera by integrating the part-specific pose information transformed into the coordinate system.

9. The method of claim 8, wherein the updating the canonical 3D model using the updated whole-body 3D pose and the part-specific control parameters comprises:

updating the canonical 3D model by transforming 3D points of the body represented in the coordinate system of the whole-body normalization camera into a coordinate system in which the canonical 3D model is represented and accumulating the 3D points in the canonical 3D model.

10. The method of claim 1, wherein the generating the part-specific rendered mages comprises:

training part-specific neural rendering models using, as an input, positions of 3D points comprised in the canonical 3D model, a viewing point of a whole-body normalization camera, and the part-specific appearance control parameters comprised in the part-specific control parameters, such that the part-specific neural rendering models output an output comprising a density value indicating a probability that the 3D points are present in a space of a canonical model coordinate system, a color value of the 3D points in the canonical model coordinate system, and information about a part in which the 3D points are present; and generating the part-specific rendered image corresponding to the controlled canonical 3D model through volume rendering using the output of the trained part-specific neural rendering models.

11. The method of claim 1, wherein, in a boundary portion where the rendered whole-body image and the rendered head image overlap, the weight of the rendered head image is determined to be greater than the weight of the rendered whole-body image as it approaches a head, and in a boundary portion where the rendered whole-body image and the rendered both-hand image overlap, the weight of the rendered both-hand image is determined to be greater than the weight of the rendered whole-body image as it approaches both hands.

12. A method of operating an electronic device, the method comprising:

receiving an image that is captured from an input camera of the electronic device and comprises a person who is a target to be modeled;

predicting a whole-body 3D pose representing a pose of the person from the image by cropping respective parts from the image, predicting 3D poses of the respective parts and combining the 3D poses of the respective parts;

generating part-specific normalized images that comprise perspective projection characteristics by arranging virtual normalization cameras corresponding to respective parts constituting a body of the person for capturing image of the respective parts at positions separated from the respective parts by predetermined distances to capture images of a head, both hands, and a whole body of the person, respectively, based on the predicted whole-body 3D pose of the person;

outputting part-specific control parameters comprising part-specific appearance control parameters representing an appearance of the person from the part-specific normalized images that preserve the perspective projection characteristics;

updating a canonical three-dimensional (3D) model in a static state with a fixed pose and size without a movement by accumulating appearance information of the person based on the part-specific control parameters;

receiving control information for controlling a 3D model of the person, which is a final output, from a user and controlling the canonical 3D model based on the control information, wherein the control information comprises camera view control information about a camera view at which the 3D model of the person is to be displayed, pose control information for the 3D model of the person, and style control information for the 3D model of the person;

generating part-specific rendered images constituting the 3D model of the person based on the controlled canonical 3D model; and generating a photorealistic 3D model of the person by synthesizing the part-specific rendered images, wherein the part-specific rendered images comprise:

a rendered head image, a rendered both-hand image, and a rendered whole-body image corresponding to the part-specific normalized images, wherein the generating the photorealistic 3D model of the person by synthesizing the part-specific rendered images comprises:

determining, for use in synthesizing the part-specific rendered images, a weight for each of the rendered whole-body image, the rendered head image, and the rendered both-hand image; and generating the photorealistic 3D model by synthesizing the rendered whole-body image, the rendered head image, and the rendered both-hand image based on the weight of each of the rendered whole-body image, the rendered head image, and the rendered both-hand image, wherein a higher weight is determined for the rendered head image and the rendered both-hand image that includes more detailed information compared to the rendered whole-body rendered image.

13. An electronic device comprising:

a processor configured to:

receive an image captured from an input camera of the electronic device and of a person who is target be modeled;

predict a whole-body 3D pose representing a pose of the person from the image by cropping respective parts from the image, predicting 3D poses of the respective parts and combining the 3D poses of the respective parts;

arrange, based on the whole-body 3D pose, virtual normalization cameras corresponding to the respective parts at predetermined distances from the respective parts;

generate, from the image, part-specific normalized images that comprise perspective projection characteristics for respective parts constituting a body of the person by capturing images of the respective parts using the virtual normalization cameras;

output part-specific control parameters comprising part-specific appearance control parameters representing an appearance of the person from the part-specific normalized images that preserve the perspective projection characteristics;

update a canonical three-dimensional (3D) model in a static state with a fixed pose and size without a movement by accumulating appearance information of the person based on the part-specific control parameters;

receive control information for controlling a 3D model of the person, which is a final output, from a user, and control the canonical 3D model based on the control information, wherein the control information comprises camera view control information about a camera view at which the 3D model of the person is to be displayed, pose control information for the 3D model of the person, and style control information for the 3D model of the person;

generate part-specific rendered images constituting the 3D model of the person based on the controlled canonical 3D model; and generate a photorealistic 3D model of the person by synthesizing the part-specific rendered images, wherein the part-specific rendered images comprise:

a rendered head image, a rendered both-hand image, and a rendered whole-body image corresponding to the part-specific normalized images, wherein the generating the photorealistic 3D model of the person by synthesizing the part-specific rendered images comprises:

determining, for use in synthesizing the part-specific rendered images, a weight for each of the rendered whole-body image, the rendered head image, and the rendered both-hand image; and generating the photorealistic 3D model by synthesizing the rendered whole-body image, the rendered head image, and the rendered both-hand image based on the weight of each of the rendered whole-body image, the rendered head image, and the rendered both-hand image, wherein a higher weight is determined for the rendered head image and the rendered both-hand image that includes more detailed information compared to the rendered whole-body image.

14. The electronic device of claim 13, wherein the processor is configured to:

predict a whole-body 3D pose representing a pose of the person based on a coordinate system of a camera capturing the image; and generate the part-specific normalized images based on the whole-body 3D pose.

15. The electronic device of claim 14, wherein the processor is configured to:

predict positions and poses of joints of a whole body of the person;

predict a pose of a head of the person;

predict a pose of both hands of the person; and predict the whole-body 3D pose based on the coordinate system by combining the positions and poses of the joints, the pose of the head, and the pose of both hands with respect to the whole body of the person.

16. The electronic device of claim 14, wherein the processor is configured to:

arrange the virtual normalization cameras for capturing images of the respective parts at positions separated by predetermined distances from the respective parts to capture images of a head, both hands, and a whole body, respectively, using the whole-body 3D pose; and generate the part-specific normalized images comprising the perspective projection characteristics using the virtual normalization cameras capturing the images of the respective parts.

17. The electronic device of claim 13, wherein the part-specific normalized images comprise:

a normalized head image, a normalized both-hand image, a normalized whole-body image obtained through the virtual normalization cameras capturing the images of the respective parts constituting the body.

18. The electronic device of claim 13, wherein the processor is configured to:

input, to part-specific control parameter prediction models, the part-specific normalized images corresponding to the part-specific control parameter prediction models, and output the part-specific control parameters comprising the part-specific appearance control parameters representing the appearance of the person.

19. The electronic device of claim 13, wherein the processor is configured to:

update a whole-body 3D pose by integrating the part-specific appearance control parameters for controlling the appearance of the 3D model of the person comprised in the part-specific control parameters, and update the canonical 3D model using the updated whole-body 3D pose and the part-specific control parameters.

* * * * *